Jan. 5, 1943.  R. T. BLAKELY  2,307,100
RECORD CONTROLLED MACHINE
Filed Oct. 26, 1939  8 Sheets-Sheet 1
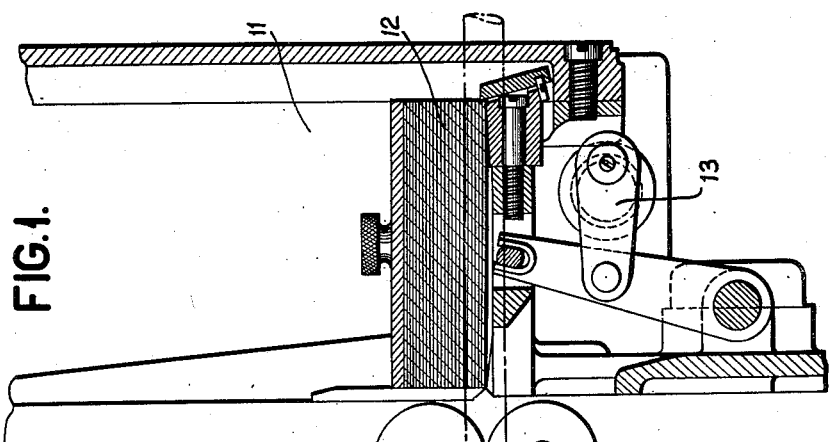
FIG.1.
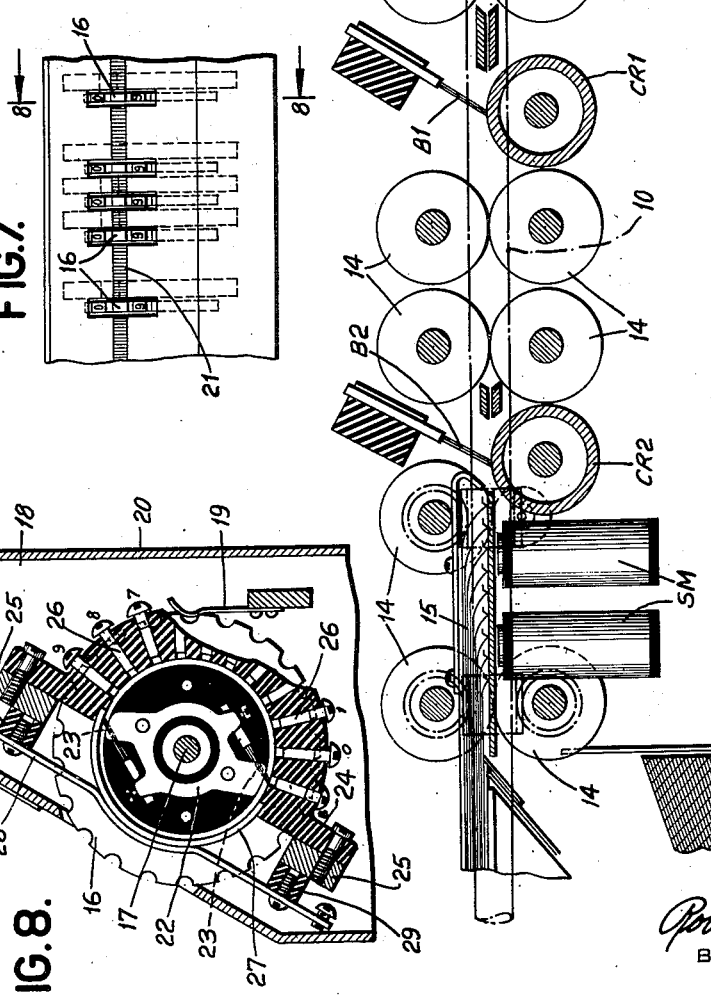
FIG.7.
FIG.8.
INVENTOR
Robert T. Blakely
BY
ATTORNEY

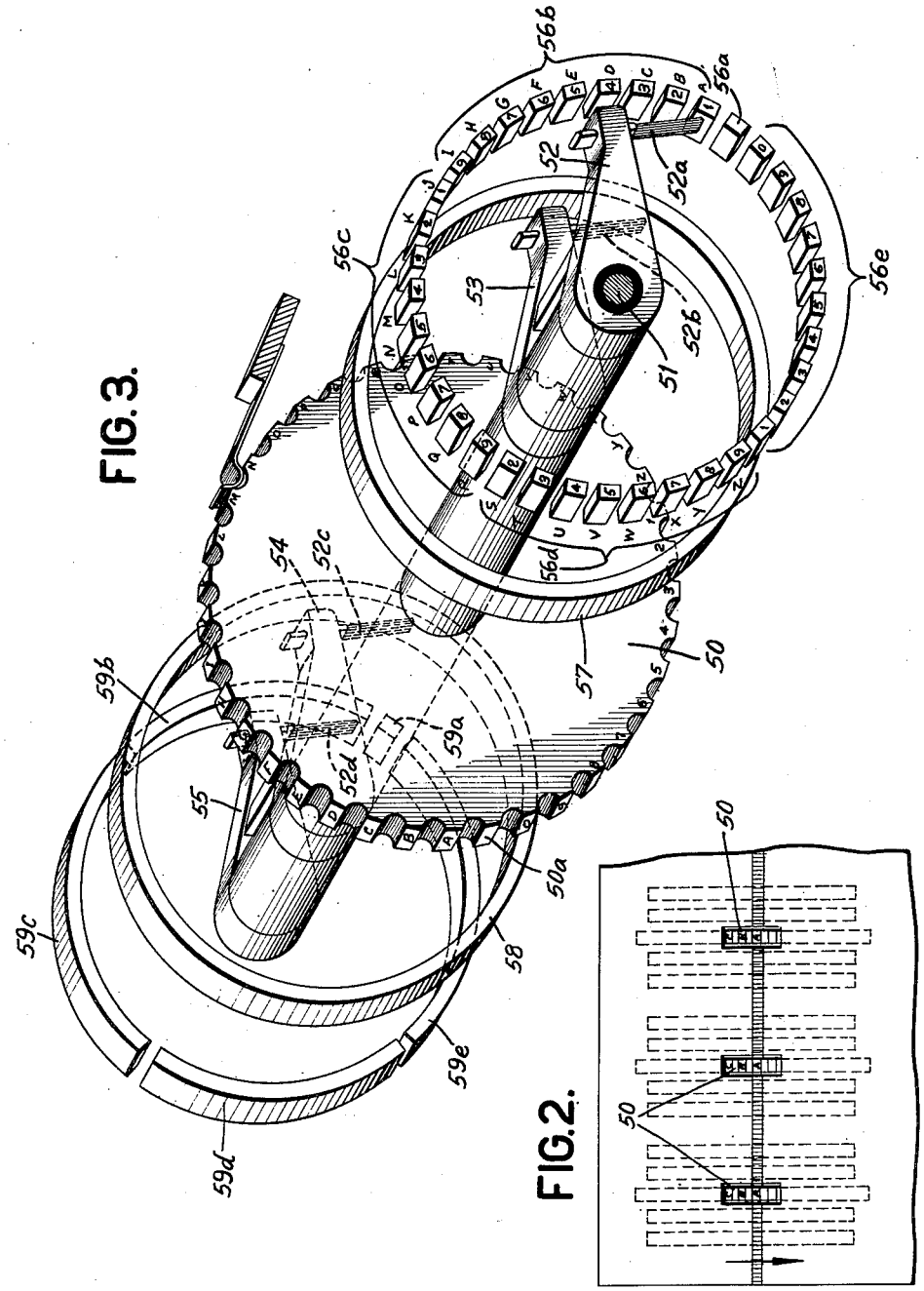

Jan. 5, 1943.  R. T. BLAKELY  2,307,100
RECORD CONTROLLED MACHINE
Filed Oct. 26, 1939   8 Sheets-Sheet 3

INVENTOR
Robert T. Blakely
BY
W. M. Wilson
ATTORNEY

Jan. 5, 1943. R. T. BLAKELY 2,307,100
RECORD CONTROLLED MACHINE
Filed Oct. 26, 1939 8 Sheets-Sheet 4

Jan. 5, 1943.   R. T. BLAKELY   2,307,100
RECORD CONTROLLED MACHINE
Filed Oct. 26, 1939   8 Sheets-Sheet 5
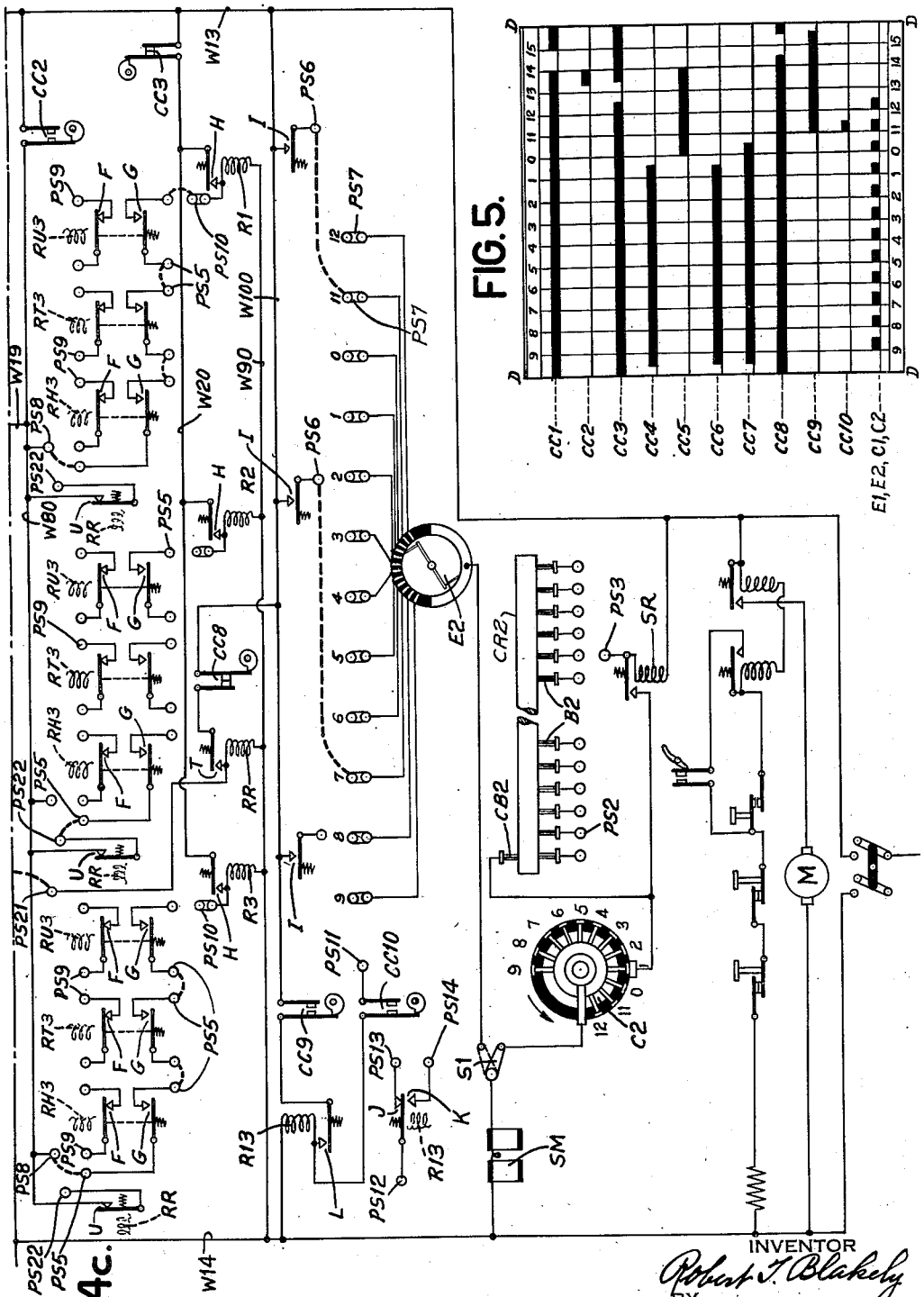
INVENTOR
Robert T. Blakely
BY
ATTORNEY INVENTOR
Robert T. Blakely
BY
ATTORNEY

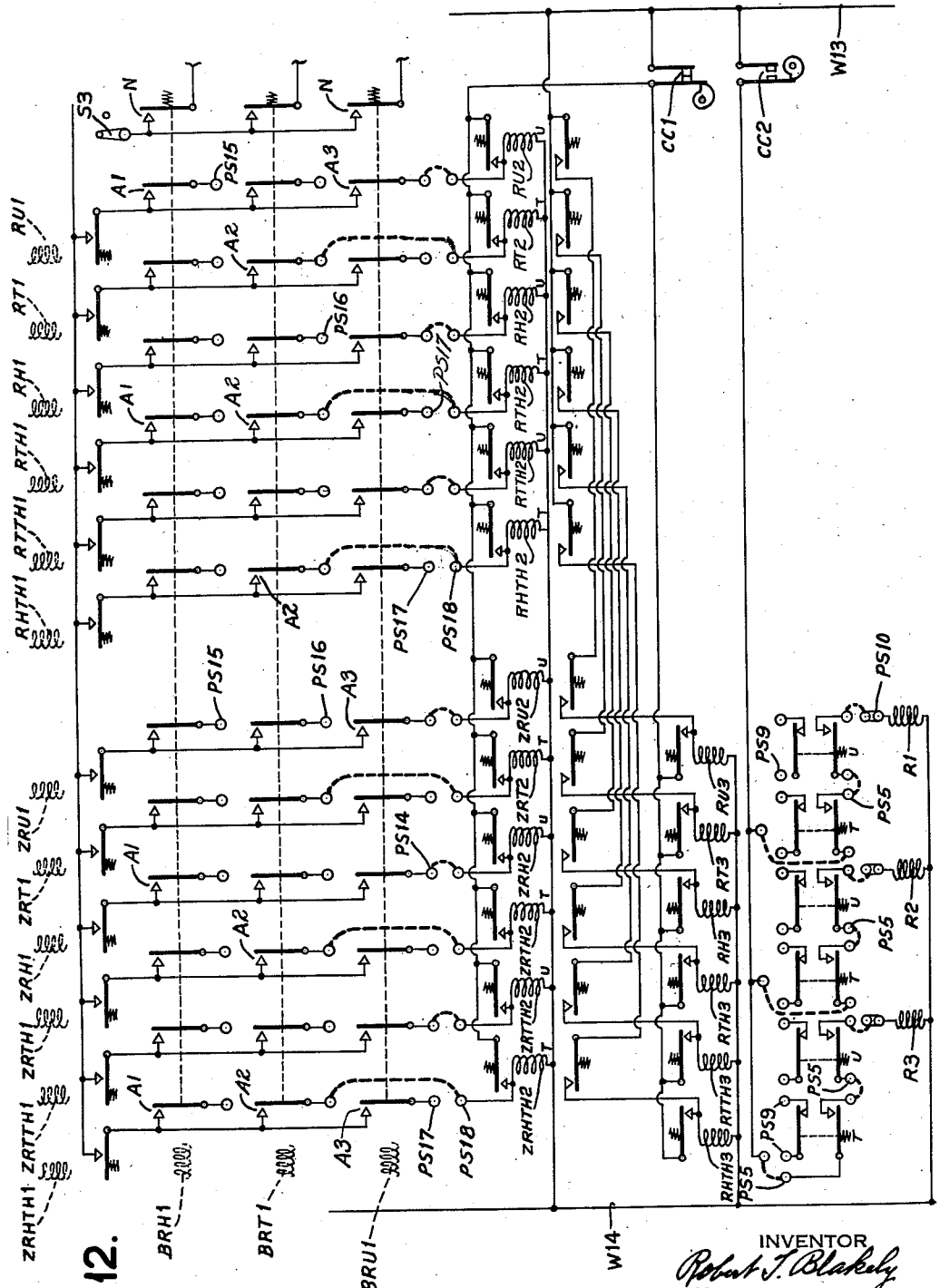

Patented Jan. 5, 1943

2,307,100

UNITED STATES PATENT OFFICE 2,307,100

RECORD CONTROLLED MACHINE

Robert T. Blakely, Ridgewood, N. J., assignor to International Business Machines Corporation, New York, N. Y., a corporation of New York Application October 26, 1939, Serial No. 301,334

11 Claims. (Cl. 209—110)

This invention relates to record-controlled machines in general and specifically to machines for sorting perforated accounting and statistical record cards.

The principal object of the present invention is to provide multi-column selecting means capable of being pre-set to represent a plurality of control numbers, a plurality of names, or a plurality of different combinations of numbers and letters.

Another object of the present invention is to provide multi-column selecting means capable of comparing control number designations in a single record field with a plurality of separate control number representations, in accordance with which the selecting means has been pre-set and controlling the operation of the machine differently for each record which agrees with one of the settings of the selecting means whereby the machine operates in the same way with respect to all records having the same control number but operates differently for the records having control numbers agreeing with the other settings of the selecting means.

Another object is to provide a multi-column selector device which may be pre-set to select records having predetermined alphabetical data, numerical data, or combinations of both alphabetical and numerical data.

An object is to provide a multi-column selector device which is capable of functioning successfully when the size of the record field may vary during the passage of the records through the machine as, for instance, where old record forms of inadequate capacity may be mixed with new record forms having greater capacity for the recording of data in the field containing the designations controlling the machine.

A further object is to provide a means for differentiating records according to type, that is, wholly alphabetical, wholly numerical, and certain types involving various permutations and combinations of alphabetical and numerical data, and controlling the operation of the machine variably according to the type of record.

An object is to provide a machine capable of sorting records according to type which does not require the use of separate special designations to distinguish the various types from each other, but differentiates the types according to the nature and disposition of the data on the record.

An object is to provide means to enable a multi-column selector device to function properly notwithstanding the fact that there may be a lack of uniformity in the practice of treating unused columns of a record field or that certain columns of a field may be deliberately left blank for some special purpose. This object may be made more clear by stating that it is sometimes the practice to perforate the records with zeros in the columns to the left of the highest digit recorded. Thus "29" is sometimes recorded in a six column record field as "000029", perforating the zeros instead of simply leaving the remaining four columns blank after perforating the units and tens columns to represent "29". Also, in recording alphabetic data, such as names and addresses it is common practice to separate the parts of a name or address by means of blank columns in order that subsequently the tabulating machine may be enabled to print the alphabetic data with the several parts correctly spaced.

An object is to provide a multiple multi-column selector device capable of selecting alphabetically designated records with means to enable the selector device to differentiate between two records having the same name, for instance, belonging to two different persons, who can only be distinguished from each other by the address or the account number.

Another object is to provide a multi-column selecting device comprising a plurality of denominational orders, each settable to represent a single digit of a number or a character such as a letter of the alphabet, which selector device is adapted to be split arbitrarily into a plurality of sections, each of which may comprise a plurality of orders, whereby said device may be set to represent a plurality of numbers, names, or combinations of numerical and alphabetical data which may be represented by data designations in a single record field.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 1 is a vertical section showing more or less diagrammatically the card feeding, sensing, and sorting mechanisms.

Fig. 2 is a front elevation of one of the manually settable data retaining devices for controlling the machine to segregate records according to predetermined numerical or alphabetic data.

Fig. 3 is a large scale diagrammatic view in perspective illustrating the construction of one order of the device shown in Fig. 2.

Figure 4A:
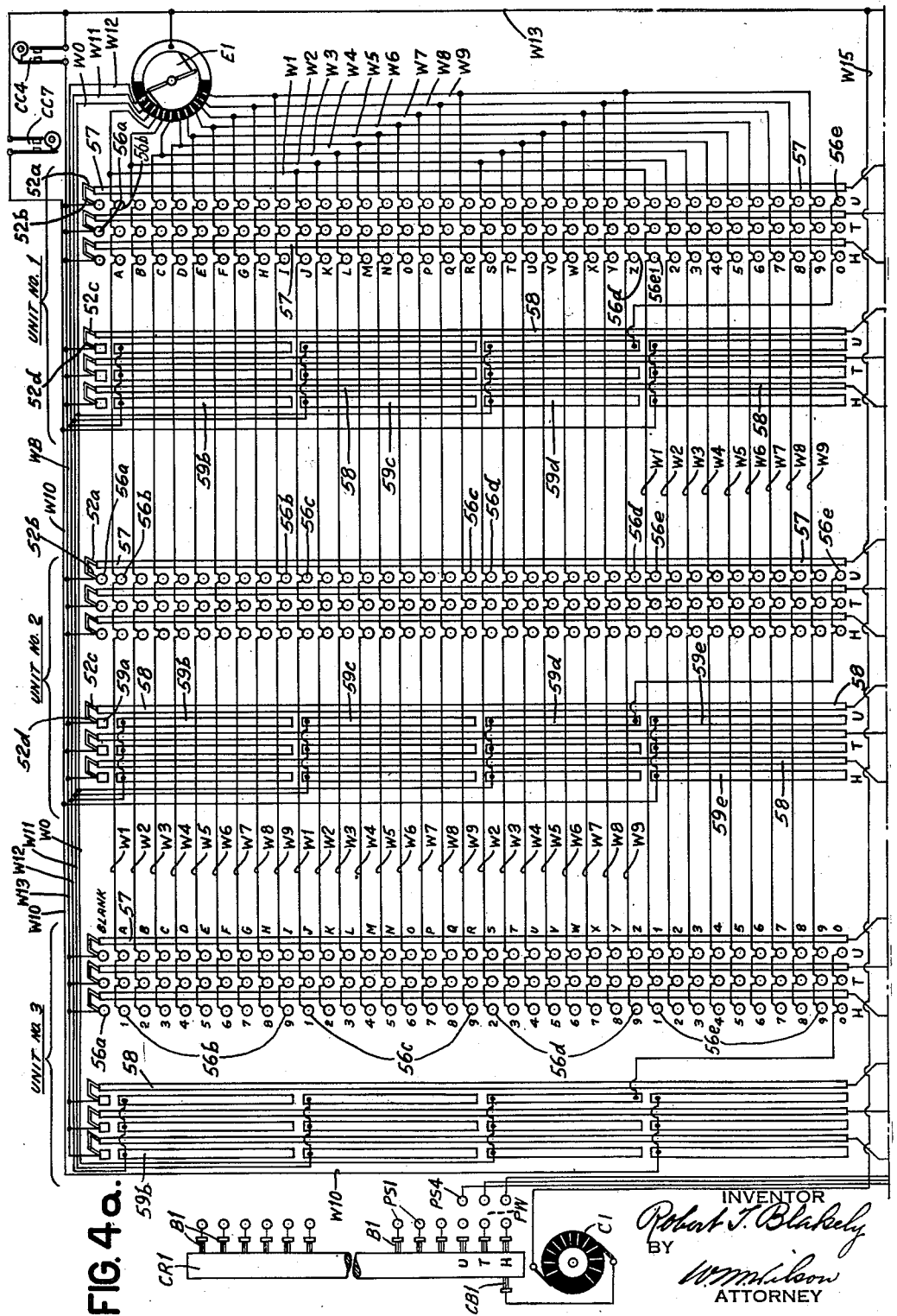
Figure 4B:
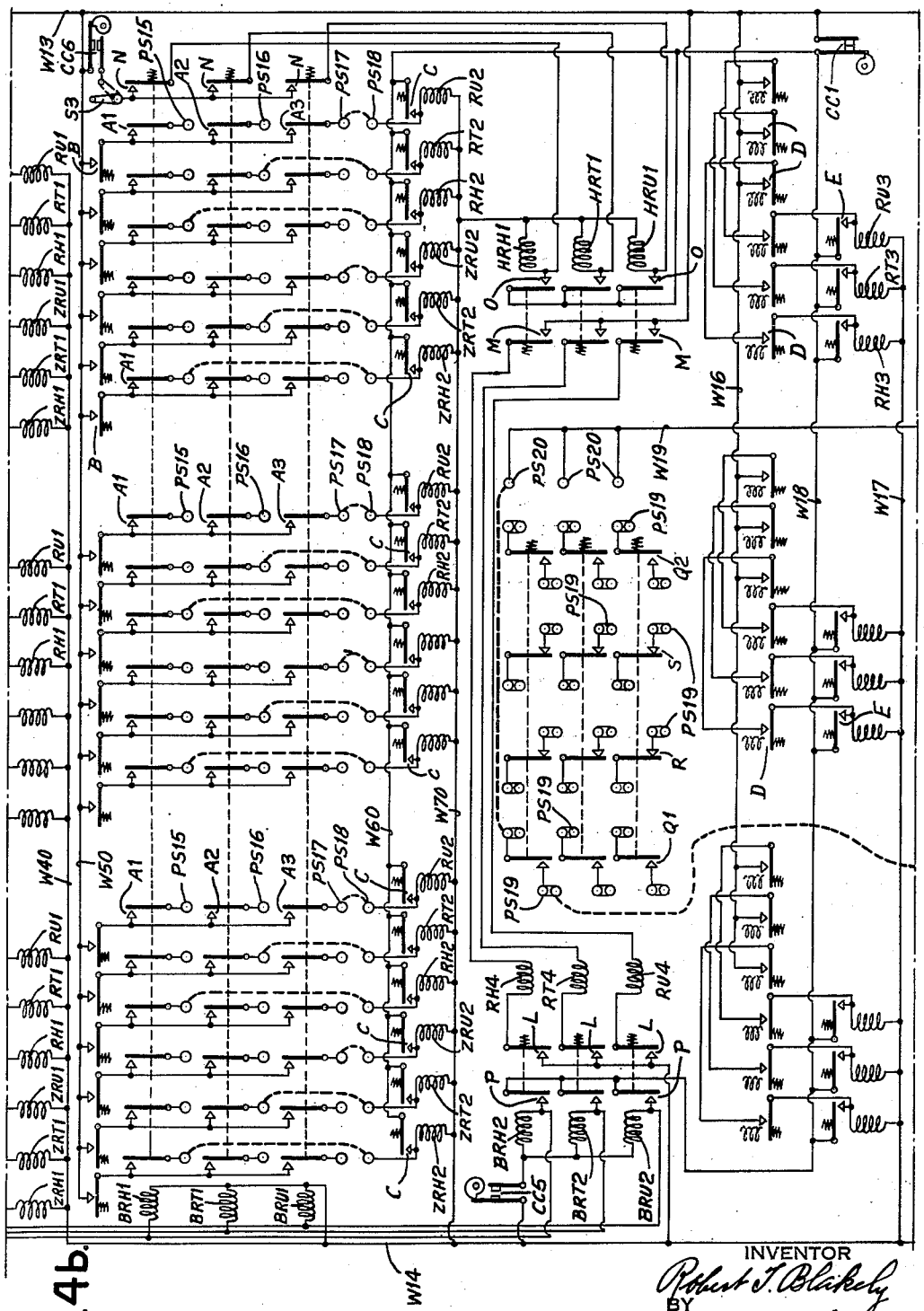

Figs. 4a, 4b, and 4c together form a wiring diagram of a machine embodying a plurality of manually settable data retaining devices like the one illustrated in Figs. 2 and 3.

Fig. 5 is an electrical time chart.

Figure 6:
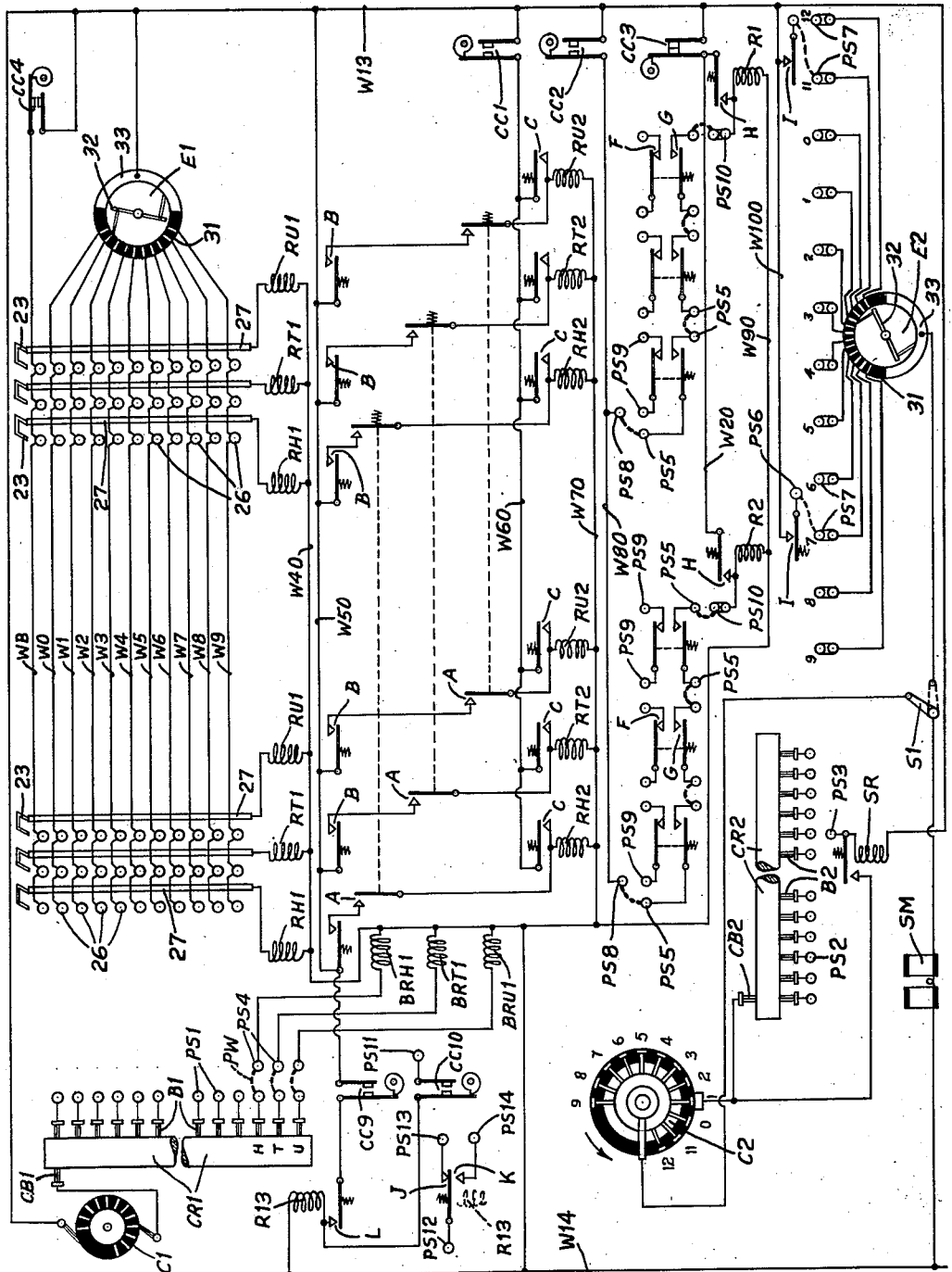

Fig. 6 is a considerably simplified form of the wiring shown in Figs. 4a, 4b, and 4c to more clearly illustrate the basic principle of the present invention.

Fig. 7 is a front view of a simplified manually settable data retaining device suitable for controlling the machine in accordance with numbers only.

Fig. 8 is a vertical section on the line 8—8 in Fig. 6.

Figs. 9 to 12 inclusive, are supplemental wiring diagrams to illustrate the plugging of the machine for various functions.

The principle on which the present invention is based will first be described with reference to a simple form in which the machine is controlled in accordance with numbers only, such as serial numbers, code numbers, account numbers, and so on, which may consist of one or more digits.

Figs. 6, 7, and 8 show a form of the invention in which the alphabetic multi-column selection feature has been eliminated to facilitate understanding the basic principles of the invention.

The invention has been illustrated in the drawings as applied to an electrically controlled sorting machine of the type disclosed in Patent No. 1,741,985 in which the distribution of the cards to the several pockets is effected by means of a series of sorting blades controlled by a single magnet. It will be understood, however, that the invention is not limited in its application to the specific form of sorting machine disclosed in said patent but may be embodied in other sorting machines. Nor is the invention limited to sorting machines as it may be usefully employed in other record-controlled machines, such as record-controlled tabulating machines.

In order to embody the present invention in a machine like the one disclosed in the above patent, the single card sensing brush disclosed therein, together with the usual brush shifting mechanism, is replaced by two complete sets of brushes spaced apart the equivalent of one cycle of card feed. These brushes are designated B1 and B2 in Figs. 1, 4a, 4c, and 6. This requires that two additional sets of feed rollers be provided with consequent changes in the dimensions of the machine framework to accommodate the additional feed rollers. Aside from these changes, little alteration in the mechanical structure of machine of Patent No. 1,741,985 is required. The additional moving parts required by the present invention consist of a plurality of circuit timing cam-actuated contacts designated CC1 to CC8 in the drawings, two impulse emitters E1, E2; and a commutator C1, all of which may be assembled as a separate unit and driven in suitable fashion from the main drive shaft 10 (Fig. 1) whereby the commutator C1 and the contacts CC1 to CC8 rotate once per card cycle and emitters E1 and E2 rotate one-half revolution per card cycle. The commutator C2 is similar to the usual single column selecting commutator described in Patent No. 1,741,985 which turns at the rate of one revolution per card cycle. The remaining elements of the circuits, consisting of relays, switches, and the manually settable data retaining devices for the numerical or alphabetic data may be built as one or more separate units which may be connected to the machine only by wires or may be mounted directly on the machine frame as desired.

The invention includes a plurality of manually settable multi-column selector devices or units each of which comprises a plurality of sections or denominational orders whereby a plurality of multi-digit numbers or multi-letter alphabetic combinations such as names may be introduced into the machine and retained therein.

A simple form of unit suitable for numbers only is shown in Figs. 7 and 8 for the purpose of making clear the principles on which the invention is based with further reference to Fig. 6. In order to avoid complication of the wiring diagram, it will be assumed that each selector unit has only three denominational positions or orders capable of being set in accordance with a three-digit number. This assumption also applies to Figs. 2, 3, 4a, 4b, and 4c. Thus the wiring for only three units is shown in Figs. 4a, 4b, 4c, and 6 in order to simplify the wiring diagram as much as possible. It will be understood, however, that each unit may have more or less than three denominational positions or sections and as many units as desired may be provided, or a single large unit may be provided which may be split into sections.

The reference numeral 11 in Fig. 1 designates the usual card hopper for a batch of perforated record cards 12 from which batch certain cards are to be selected and deposited in the pockets according to the settings of one or more of the selector units. It will be understood that the cards 12 are placed in the hopper 11 in the usual way, that is, face down with the "9" index-point positions at the left.

Picker mechanism of well known form, generally designated 13 in Fig. 1, removes one card at a time from the hopper 11 and moves the card to the first set of feed rollers 14 on the right which grip the card and advance it to the left. Similar sets of feed rollers 14 carry the cards under the sensing brushes B1, B2 and over contact rollers CR1, CR2 cooperating with said brushes. There are as many brushes in each set as there are columns in the cards and the brushes are so spaced that the two sets of brushes simultaneoously sense corresponding index-point positions of two successively fed cards.

The sorting guide blades 15 are controlled by sorting magnet SM and, as usual, are so disposed that the left hand edges of the cards have a position just underneath the end of the blade 15 leading to the pocket corresponding to the value of the index-point positions on which the brushes B2 rest at any given time. Thus, if brushes B2 rest on the "7" index-point positions of a card, the left hand edge of the card will be underneath the "7" blade. The brushes B1 are used for multi-column selecting operations and other special operations, while brushes B2 are used for simple sorting operations such as arranging cards in numerical or alphabetical order. The brushes B1, B2 are connected to plug sockets PS1, PS2, respectively (Figs. 4a, 4c, and 6).

When the machine is to be used for simple sorting operations, a plug wire is inserted between a plug socket PS3 and the plug socket PS2 corresponding to the brush B2 sensing the selected column of the cards, and a switch S1 is placed in the position shown in Figs. 4c and 6 by solid lines.

Assuming that sorting is to be accomplished under control of the perforations in a given column and a hole occurs in the "7" position, the following circuit will be established at the "7" point in the cycle: Line wire W14 (Figs. 4c or 6), sorting magnet SM, switch S1, commutator C2, common brush CB2, contact roller CR2, brush B2, the plug wire between plug sockets PS2, PS3, and sorting relay SR, to line wire W2. Relay SR closes its contacts to shunt the operative brush B2 while the sorting magnet SM draws down all of the blades to the left of the "7" blade (Fig. 1) as described in the above patent. The card having the "7" perforation is guided between the "6" and "7" blades and eventually drops in the "7" pocket. If no perforation appears in the column of the card sensed by brush B2, the card passes underneath all the blades and eventually falls in the reject pocket.

Switch S1 is placed in the position shown by the broken lines in Figs. 4c and 6 for multi-column selecting operations to place the sorting magnet SM in circuit with emitter E2. The control numbers of the records to be segregated are inserted in the machine by setting manually settable selector devices, there being a plurality of such devices provided for this purpose, each capable of being set according to a single number comprising a plurality of digits.

These selector devices, in a simple form, may consist of a plurality of number wheels 16 (Figs. 7 and 8) rotatably mounted on a shaft 17 supported by frame plates 18. The wheels 16 may be made of some form of molded composition such as "Bakelite," and may be arranged in groups on shaft 17, each group constituting one selector device. As shown in Fig. 7, each group has three wheels whereby any number having three digits or less may be introduced into the machine, and for this purpose each wheel 16 is notched at intervals to facilitate turning the wheels by hand and also, in cooperation with a spring detent 19 (Fig. 8), to hold the wheels in set position.

The faces of the projections formed as a consequence of the notches are engraved, embossed, or otherwise suitably marked, with the numerals "0" to "9". There are two series of such numerals and two blank projections, letters occurring between the numerals "0" and "9", as shown in Fig. 7. The casing 20 is provided with slots through which the wheels 16 project to enable them to be turned. Since it is necessary that several of the engraved projections extend through the slots in casing 20 to provide sufficient gripping surface to turn the wheels, it is convenient to have a mark of some kind on casing 20, such as a wide index band 21 of a color contrasting with that of the casing, to provide a reference point opposite or in register with which each of the numerals or letters on the wheels 16 may be brought as desired.

Secured to the side of each wheel 16 is a brush holder 22 (Fig. 8) of conducting material having two diametrically opposite brushes 23. Associated with each wheel 16 is an arcuate member 24, preferably molded from plastic insulating material, secured to two support bars 25 extending parallel with, and on opposite sides of, the shaft 17. Each of the members 24 has a series of eleven commutator segments 26 having the same angular spacing relative to the shaft 17 as the projections on the wheels 16. The segments are evaluated "B", "0", "1", * * * * * * "7", "8", "9", in a counterclockwise direction in Fig. 8. The brush holders 22 are secured to wheels 16 in such a relation that one of the brushes 23 for each wheel will bear on the correspondingly designated segment 26 when the associated wheel is manually set to bring a given numeral or the blank projection on the wheel in register with the index band 21. Thus, if a wheel 16 were set at "6", one of the associated brushes 23 will bear on the "6" segment 26.

Associated with each row of segments 26 and on the opposite side of shaft 17 is a separate semicircular common contact strip 27. The latter are seated at their ends in shoulders formed in the members 24 and are clamped in place by means of clamping strips 28 individual to each contact strip 27. The clamping strips are secured at their ends to bars 29 of insulating material secured to bars 25. When one brush 23 of a pair is resting on any one of the segments 26, the other brush rests on the associated contact strip 27. Thus each denominational order of the selector device comprises a wheel 16, a pair of brushes 23, a row of segments 26, and a common contact strip 27.

The correspondingly valued segments 26 of all the selector devices, except those for the blank projections, are electrically connected by means of bus wires W0 to W9 to one of the segments of emitter E1 (Fig. 6) whereby the segments 26 are progressively electrically connected to line wire W13 in synchronism with the sensing of the perforated record cards by the brushes B1. For example, all the "6" segments 26 are electrically connected to line wire W13 when the brushes B1 sense the "6" index-point positions of a record card. The segments 26 for the blank projections are connected together by a bus wire WB. Emitters E1, E2 may be of a form well known in the art, comprising a row of ten segments 31 (Fig. 6) each corresponding to one of the index point positions "0" to "9" inclusive, a pair of rotary brushes 32, and a common contact strip 33 disposed in the same general fashion as the brushes 23, segments 26, and contact strip 27 of the selector devices. The brushes of emitters E1, E2 are rotated in synchronism with the sensing of the cards by brushes B1, B2 by means of a suitable connection to shaft 10 (Fig. 1).

The common contact strips 27 for the units, tens, and hundreds orders of each selector device are connected to relays RU1, RT1, and RH1, respectively, associated with that device, there being a separate relay for each order of each device. Only the six relays RU1, RT1, RH1 corresponding to two selector units are shown in Fig. 6 in order to simplify the drawing. The coils of these relays are all connected to a common bus wire W40 leading to line wire W14. There are three brush relays BRU1, BRT1, BRH1 each having a plurality of pairs of contacts A in series with the contacts B of relays RU1, RT1, RH1 and the coils of relays RU2, RT2, RH2 across bus wires W50 and W70. Relay BRU1, for example, in Fig. 6 closes two sets of contacts A each of which is in a series circuit between bus wires W50, W70 comprising contacts B of one of the relays RU1 and the coil of the associated relay RU2. In other words, if both relay BRU1 and the right-hand relay RU1 are simultaneously energized, right-hand relay RU2 will be energized over a circuit from line wire W14, bus wire W70, coil of right-hand relay RU2, contacts A of relay BRU1, contacts B of right-hand relay RU1, and bus wire W50, to line wire W13.

It is apparent that for each selector device comprising three denominational orders there are two sets of relays RU1, RT1, RH1, and RU2, RT2, RH2, respectively, and three sets of contacts A which are operated by the three relays BRU1, BRT1, BRH1. It will be observed that the association of these relays denominationally is indicated by the letters "U," "T," "H" denoting the relays belonging to the units, tens, and hundreds orders, respectively. Thus with the relay BRU1 there is associated two pairs of relays RU1, RU2 corresponding to the units orders of the two selector units shown diagrammatically at the top of Fig. 6.

Relays BRU1, BRT1, BRH1 correspond to the units, tens, and hundreds columns of a field on the card in which control numbers, such as account numbers are recorded by means of data designations. These relays are individually connected to plug sockets PS4 whereby the relays may be connected to the three brushes B1 sensing the control number field by means of plug wires PW inserted between the plug sockets PS1 and PS4. The letters "U," "T," "H" adjacent brushes B1 in Fig. 6 designate the denominational orders sensed by the respective brushes B1.

It will be assumed that it is desired to segregate from each other and from the remaining cards of a batch, those designated with account numbers 991 and 992. These numbers may be introduced into the machine by turning the units wheel 16 of the left-hand selector unit in Fig. 6 to register "1" and similarly set the right-hand unit to "2" in the units order. The other wheels of both selector units will be set to "9." The brushes 23 of the respective orders are thereby rotated so that the "1" segment of the units order of the left-hand selector unit is electrically connected to the associated common strip 27 and hence to the coil of the left-hand relay RU1. The "2" segment of the units order of the right-hand unit is similarly connected to the right-hand relay RU1, while the "9" segments of the remaining orders are connected to the corresponding relays RT1, RH1.

Let it be assumed that the first card is designated "991." At the "9" point in the cycle in which the first card passes brushes B1, two initial and co-incidental circuits will be established for both the tens and hundreds orders of both selector units. The "9" hole in the tens column permits a circuit from line wire W13, through the "9" segment of commutator C1, brush CB1, contact roller CR1, tens brush B1, a plug wire PW, and relay BRT1, to line wire W14. Relay BRT1 closes those sets of contacts A which are in series with the respective relays RT2. The second circuit extends from line wire W13; through common strip 33, brushes 32, and the "9" segment of emitter E1; bus wire W9; the "9" segment 26, brushes 23, and common strip 27 for the ten order of the left-hand selector unit in Fig. 6; the left-hand relay RT1, and bus wire W40 to line wire W14. Both of these initial circuits are momentary and are broken by commutator C1 before the brush B1 for the tens column leaves the "9" hole in this column. Similarly relay BRH, both relays RH1, and the right-hand relay RT1 are energized at the same time.

As a consequence of the simultaneous closure of the contacts A of relay BRT1 and contacts B of both relays RT1, two parallel and identical circuits are established through the coils of the relays RT2 as follows: Line wire W13, contacts B of both relays RT1, both sets of contacts A of relay BRT1, the coils of both relays RT2, and bus wire W70, to line wire W14. In a similar way relay RH2 is energized at the "9" point in the cycle since the hundreds column of the control number field has a "9" hole.

When the "1" hole in the units column of the control number field is sensed by the units brush B1, both the relay BRU1 and the left-hand relay RU1 will be energized, since one of the brushes 23 for the units position of the left-hand unit will be resting on the "1" segment. Consequently, the left-hand relay RU2 will be energized at the "1" point in the cycle. All of the relays RU2, RT2, RH2 of the left-hand unit are now energized and close their contacts C to establish holding circuits for themselves, typically as follows: Line wire W13, contacts CC1, contacts C of left-hand relay RU2, and bus wire W70, to line wire W14.

Relay RU2 for the right-hand unit is not energized as at the "2" point in the cycle only the right-hand relay RU1 is energized, while at the "1" position in the cycle only relay BRU1 and the left-hand relay RU1 can be energized. Thus, at the end of the card sensing period of the cycle, the left-hand group of relays RU2, RT2, RH2 are all energized while only relays RT2, RH2, of the right-hand group are energized.

The relays RU2, RT2, RH2 operate pairs of contacts designated F and G in Fig. 6, each relay opening contacts F and closing contacts G whenever the relay is energized. The contacts F are connected to plug sockets PS9 while contacts G are connected to plug sockets PS5 which make it possible to connect the contacts F and G in any desired way, whether series, parallel, or series-parallel. The purpose of this arrangement will be made clear hereinafter. Each selector unit has associated with it a group of such contacts F and G.

There is also provided a number of relays designated R1, R2, and so on, each of which controls the disposition of a record in a particular pocket. The coils of the relays R1, R2, etc., are connected in common to the line wire W14 through bus wire W90 and individually to plug sockets PS10 to enable any of these relays to be connected by plug wires to any of the contacts F and G by means of the plug sockets PS5 and PS9. The contacts H of the relays R1, R2 are connected in common to contacts CC3 through bus wire W20 and individually to the coils of the relays whereby energization of any of these relays establishes a holding circuit for itself extending from line wire W14, bus wire W90 through the coil of the relay, its contacts H, wire W20, and contacts CC3, to line wire W13. The relays R1, R2, etc., close contacts I which are connected in common, by a wire W100, to the line wire W13 and individually to plug sockets PS6 by means of which the contacts I may be connected to any one of the plug sockets PS7 which, in turn, are connected to the segments of emitter E2.

It will be assumed that it is desired to place the cards designated 991 and 992 in the "7" and "11" pockets, respectively. Accordingly, relay R1 may be placed in series with all the normally open contacts G of the relays RU2, RT2, RH2 of the right-hand selector unit (Fig. 6) and with the cam contacts CC2 by inserting plug wires between the plug sockets PS8, PS5, PS6, and PS7 as shown by dotted lines. As a result of this plugging the relay R1 will be energized whenever all three of the contacts G associated with the right-hand selector unit are closed. In a similar manner, the contacts G associated with the relays RU2, RT2, RH2 of the left-hand unit are connected in series with the relay R2. The contacts I of relay R1 are connected by a plug wire to the plug socket PS7 associated with the "11" segment of emitter E2 and the contacts I of relay R2 are similarly connected to the plug socket PS7 associated with the "7" segment.

Cam contacts CC2 close before CC1 open (Fig. 5) near the end of the cycle and energize relay R2 by a circuit extending from line wire W14, bus wire W90, the coil of relay R2, the plug wire, contacts G of the left-hand group of relays RU2, RT2, RH2 in series, the plug wire, bus wire W80, and contacts CC2, to line wire W13. Contacts CC3 close about the same time as contacts CC2 and relay R2 is kept energized through most of the following cycle by a holding circuit extending from the coil of relay R2, through contacts H of said relay, and contacts CC3, to line wire W13.

While the brushes B1 are sensing the second card, the leading edge of the first card will be passing under the ends of the sorting blades 15 (Fig. 1). At the "7" point in the cycle, when the first card is just under the end of the "7" blade, a circuit is established as follows: Line wire W14, sorting magnet SM, switch S1 (in dotted line position); common strip 33, brushes 32, and the "7" segment of emitter E2; the plug wire, contacts I of relay R2; and bus wire W100, to line wire W13. As a result the first card, designated 991 will be deposited in the "7" pocket.

If the next card bears the control number 992 a similar series of circuits is established to cause relay R1 to become energized whereby this card becomes deposited in the "11" pocket. When the control number on any card fails to agree with the setting of any selector unit, one or more of the relays RU2, RT2, RH2 of each selector unit will not be energized whereby one or more of the contacts G will remain open and prevent energization of any of relays R1, R2, and so on.

The foregoing explanation presumes that all columns of the control number field are perforated either with zeros or with one of the numerals "1" to "9," that is, small numbers are always recorded by perforating zeros in the columns to the left of the highest denominational order. In other words, a number like "23" is recorded in the control number field as "023" instead of simply leaving the hundreds column blank, as is sometimes done. Formerly it was the practice to always perforate zeros in all the unused columns of the card fields. This was done partly as a means of indicating that no other numeral should be recorded and partly because the presence of the zeros formerly was vital to the proper functioning of certain mechanisms in the machines using the perforated cards. However, improvements in tabulators, perforating machines, and other equipment used in perforated record card accounting systems have made it no longer necessary to always punch zeros and it is often the practice to leave blank those columns of a record field which are not needed for recording a control number.

Another point of importance is that it is quite possible that two or more of the selector units may be set in accordance with control numbers which are alike in the lower orders and differ only in one or more of the higher orders. As an example, it might be desired to select those cards designated 3, 23, and 823. Theoretically, cards designated 003 could be selected by setting the units wheel 16 of the right-hand selector unit to "3" and inserting one plug wire between one of the plug sockets PS8 (Fig. 6) and one of the plug sockets PS5 associated with contacts G of the relay RU2 for such unit and another plug wire between the other plug socket PS5 and plug socket PS10 of relay R1 to confine operation of the right-hand selector unit to the units order. Another unit could similarly be set to render only the units and tens positions of the selected unit effective to select cards numbered 23 and a third unit could be set to render the units, tens, and hundreds positions effective to select cards numbered 823.

As a matter of fact this cannot be done without supplementary control means since any card with a control number having several digits and a "3" in the units order, for instance, the one perforated 823 would have the same effect as a card designated 3 with respect to the right-hand selector unit. Similarly a card designated 823 will be selected by the selector unit set to select cards designated 23 or 3. Thus, a card designated 823 would cause three of the relays R1, R2, etc., to be energized. Since the order of sensing the cards is 9, 8, 7 . . . 0, 11, 12, if the card designated 3 was supposed to go to the "9" pocket and the cards designated 823 to the "8" pocket the 823 cards would actually become deposited in the "9" pocket as would any card having a 3 in the units order.

When all zeros are perforated, with the circuits so far described, as many denominational positions must be used in each operative selector unit as there are denominational orders in the largest control number. In other words, to properly segregate cards perforated 923, 23, and 3, the cards must be perforated 923, 023, and 003 respectively, and three orders of each operative selector unit must be used. Under these conditions, either or both of the relays RH2, RT2 will be energized as a consequence of the presence of zero holes in the corresponding columns whereby the cards will be properly sorted to the pockets assigned to the different control numbers. However, if a card having one or both of the hundreds or thousands columns blank is sensed, the relays RH2, RT2 will not be energized and this card will be rejected in spite of the fact that it might be designated by the same control number with which one of the selector units is set.

Since it may be desired to sort cards which may not have zero designations in the columns to the left of the highest significant digit, as well as those that do have zero designations, means is provided that is automatically effective to energize those of relays RT1, RH1, for the tens, hundreds, and higher orders corresponding to the columns of the card which are blank. This means also permits the proper relays R1, R2, etc., to be energized when the cards have zero designations instead of being left blank.

Figure 9:
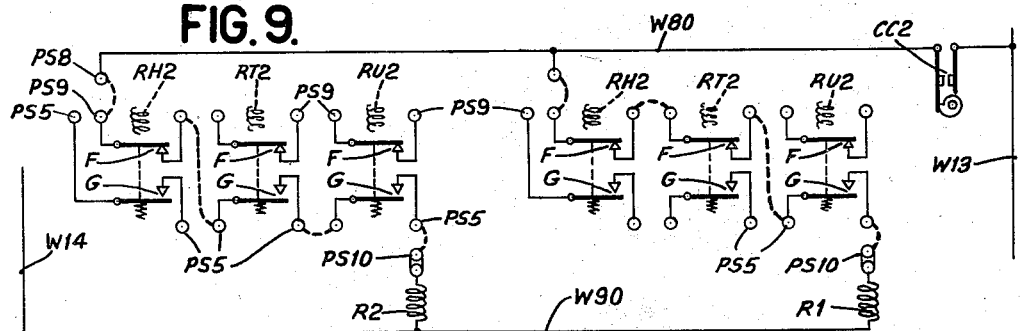

The foregoing means includes normally closed contacts F of relays RT2, RH2, and so on for the higher orders, and circuits controlled by the "blank" segments 26 of the selector units. When it is anticipated that some of the cards may have zero holes in the columns of higher order and other cards may not, the wheels 16 of the selector units corresponding to those denominational orders which may or may not contain a zero hole are turned until the blank projection on said wheels is in register with the index line 21. The control numbers "003" and "023", for example, will be introduced into the right-hand and left-hand selector units (Fig. 6) by turning the wheels 16 to indicate "BB3" and "B23," respectively, the "B" signifying "blank." The control number "003," for example, may be introduced into the machine by turning the hundreds and tens orders of the right-hand unit (Fig. 6) to the blank position and turning the units wheel to indicate 3. In similar fashion, the wheels of the left-hand unit are turned so that this unit displays the blank position of the hundreds wheel, the 2 of the tens wheel, and the 3 of the unit wheel. With reference to Fig. 9, plug wires are inserted, as shown by dotted lines, so as to place the relay RI in series with the open contacts G of the right-hand relay RU2 and the closed contacts F of the right-hand relays RH2, RT2. Plug wires are also inserted to place relay R2 in series with the contacts G of the left-hand relays RT2, RU2 and with the contacts F of left-hand relay RH2. This places relay RI under control of contacts F of right-hand relays RH2, RT2 and contacts G of right-hand relay RU2 and places relay R2 under control of contacts F of left-hand relay RH2 and contacts G of relays RT2, RU2.

Let it be assumed that a card is sensed having the control number 3, with the hundreds and tens columns blank. Since no holes appear in these columns, none of relays RH2, RT2 will be energized and contacts F of these relays will remain closed and contacts G open. Both relays RU2 will be energized since both selector units are set to "3" in the units order. Since contacts F of the right-hand relays RH2, RT2 and contacts G of relay RU2 for the right-hand unit are all closed, relay RI will be energized. However, relay R2 will not be energized since contacts G of relay RT2 for the left-hand selector unit have not been closed. The circuit for relay RI is the same as first traced above except that it is maintained through the normally closed contacts F of the right-hand relays RH2, RT2 instead of contacts G of these relays. With the contacts I of relays RI, R2 plugged to the plug sockets PS7 for the "11" and "7" segments 31, respectively, as above, the card designated 3 will be conveyed to the "11" pocket.

Now let it be assumed that a card having the control number 23 with the hundreds column blank is sensed. Contacts G of relays RU2, RT2 for the left-hand selector unit will be closed in the manner described above, while contacts F of both relays RH2 will remain closed. Since contacts G of left-hand relays RT2 and RU2 have been closed and contacts F of relay RH2 remain closed, the relay R2 will be energized to cause the card having the control number 23 to become deposited in the 7 pocket. The relay RI, however, will not be energized, notwithstanding the fact that it would appear from Fig. 9 that this relay should be energized by a circuit through contacts G of relay RU2 and contacts F of relays RT2, RH2.

It will be noted from Fig. 5 that the contacts CC4 are closed from the "9" point to and including the "1" point in the cycle but are open at the "0" point. Since the wheels 16 for the tens and hundreds order of the right-hand unit have been set to the blank position, the closure of contacts CC4 at the beginning of a cycle will establish circuits through both right-hand relays RH1, RT1 as follows: line wire W13, contacts CC4, blank segments 26 of the right-hand selector unit, common contact strips 27 for the right-hand unit, the coils of both relays RT1, RH1 and bus wire W40 to line wire W14.

At the "2" point in the cycle, the brush relay BRT will be energized in consequence of the "2" hole in the tens column of the card and, since relay RT1 will also be energized at this time by emitter E1, the relay RT2 of the right-hand selector unit will be energized notwithstanding the fact that the right-hand unit is not set to select cards designated 23. Relay RT2 will open its contacts F and close its contacts G and this has the effect of preventing a circuit through relay RI. Therefore, the card designated 23 not only has the effect of rendering the left-hand selector unit effective to cause the selection of this card, but it also renders the right-hand unit ineffective to select this card.

It will be noted by reference to Fig. 9, that energization of either of the right-hand relays RT2, RH2 will have the same effect since the contacts F of such relays are in series with the contacts G of the right-hand relay RU2. It is apparent therefore that any card which has a hole other than "0" in the tens and hundreds columns will cause the energization of one or both of the relays RT2, RH2 for the right-hand unit and prevent closure of a circuit through relay RI. It is thus impossible for the right-hand selector unit to select cards which may happen to correspond in the units column to the setting of the units order of the selector unit. Similarly, with reference to Fig. 9, it will be noted that the contacts F of the left-hand relay RH2 will have the same effect on the relay R2 and any hole other than "0" in the hundreds column of the card field will cause the energization of both relays RH2 and positively prevent energizing the relays RI, R2.

Since contacts CC4 are open at the "0" point in the cycle, a card having "0" holes in the columns corresponding to the orders of the selector units which are set to the blank position will have no effect on the relays corresponding to such column other than to cause the energization of one or more of the brush relays BRU1, BRT1, BRH1, etc., and these operating alone can have no effect. For example, taking the case of the card designated 3 discussed above, had this card been perforated 003, the closure of contacts CC4 will have no effect on the right-hand selector unit and the contacts F of relays RT2, RH2 of this unit will remain closed to enable a circuit to be established through the relay RI.

The subsidiary control exercised by the relays RH2, RT2, RU2, through their contacts F, in conjunction with other means hereinafter described, makes it possible to use a batch of cards having the control number fields varying in respect to the number of columns constituting said fields. It may be found that the card forms originally designed for use in a system of perforated card accounting prove inadequate in capacity owing to a greater increase in the number of accounts or classifications than anticipated.

In order to simplify the description, it will be assumed that the card fields of the old cards are limited to two columns whereas card fields of the new cards contain three columns. It will be understood, of course, that in actual practice the card number fields will contain a considerably larger number of columns, but it would be difficult to explain the invention in reference to a larger number of columns without complicating the wiring diagram by unnecessary duplication of circuits and for present purposes, it will be assumed that the selector units comprise only three positions. For the purpose of automatically changing the number of columns on the card which are actually compared with the selector units, there is provided a relay R13 (Fig. 6).

Relay R13 is of the transfer type having normally closed contacts J (Fig. 10) and normally open contacts K which are closed each time the coil of the relay is energized. It will be assumed that the old cards which do not have the necessary number of columns in the control number field have a special designation such as an "11" hole in some column other than the columns containing the control number designations. The relay R13 as shown in Fig. 6 has one end of its coil connected to line wire W14, while the other end of the coil is connected to a plug socket PS11 through contacts CC10 which are arranged to close momentarily at the "11" point in the cycle (Fig. 5). The plug socket PS11 is connected by a plug wire to the plug socket PS1 associated with the brush B1 which senses the column containing the "11" hole. The contacts L of relay R13 are connected to wire W50 through the contacts CC9 which open momentarily at the "15" point in the cycle (Fig. 5) while contacts J and K are connected to plug sockets PS12, PS13, PS14.

There are a number of special conditions of selection which must be successfully met by the mechanism and in order to make clear how the circuits are designed to cause cards to be properly selected, notwithstanding certain special conditions, the worst condition possible will be assumed in order to show hereinafter how the machine takes care of these conditions. For this purpose, it will be assumed that the right-hand selector unit (Fig. 6) has been set to select cards designated 58 recorded by means of two perforations in a two-column account number feed, and that the hundreds wheel 16 of this unit is set to the blank position. As will be seen later, it is necessary that the right-hand unit (Fig. 6) be set in the blank position in the hundreds order in order to take care of certain such conditions which would cause an incorrect selection. The left-hand unit will be set to select cards designated 958. The contacts J and K of the special control relay R13 and contacts F and G of relays RU2, RT2, RH2 are plugged as shown by dotted lines in Fig. 10. The effect of this plugging is to form a normal series circuit comprising relay R2, all of the contacts G of the relays RH2, RT2, RU2 of the left-hand selector unit, a pair of the contacts J of relay R13, and contacts CC2. On the other hand, the relay R1 is placed in series with the contacts G of the right-hand relays RT2, RU2, contacts F of right-hand relay RH2, another pair of contacts J of relay R13, and contacts CC2.

The selector units must all be rendered operative for the maximum number of columns likely to be present in the control number field, which in this illustrative case, requires that each selector unit be made effective for three denominational orders. This is necessary because some of the numbers which appear in the old cards may also appear in some of the new cards. Since the old cards are apt to contain perforations in the columns immediately to the left of the control number field, there is a possibility that some of these perforations with others in the control number field may correspond to the settings of one or more of the selector units which have been set to select control numbers having a greater number of digits than the capacity of the field in the old card. Thus, it is possible that an old card actually designated with the control number 58 may happen to have a "9" hole in the column immediately to the left of the one containing the "5" hole. Were no means provided to prevent it, this card would be selected by the left-hand selector unit. Thus there are certain cases of possible misoperation incidental to the selection of cards from a batch in which the number of columns in the field varies which must be taken into consideration and prevented. These possible misoperations will be illustrated by way of example.

It will be assumed that there is sensed one of the old cards provided with an "11" hole to differentiate it from the new cards and is designated 58 with the column corresponding to the hundreds orders of the selector units blank. This blank column, of course, belongs to a different field and, as will be seen later, may in some cases have a hole. In so far as the comparison between the holes in this card and the left-hand selector unit is concerned, this card has no effect. The reason for this is that the presence of the "11" hole in this card causes relay R13 to become energized over a circuit extending from line wire W13 (Fig. 6), commutator C1, the common brush CB1, the contact roller CR1, the brush B1 sensing the "11" hole, the plug wire, plug socket PS11, contacts CC10, and the coil of relay R13, to line wire W14. The contacts CC9 close and establish a holding circuit for relay R13 until near the end of the cycle (Fig. 5) through contacts L, the contacts CC9, and bus wire W50 to the line wire 13.

Relay R13 opens all of its contacts J (Fig. 10) and thereby prevents energization of relay R2 owing to the manner in which the contacts G of the left-hand selector unit are plugged. Thus, the left-hand selector unit will not function to select any old card. With respect to the right-hand unit, however, the closure of contacts K of relay R13 renders this unit effective only with respect to the units and tens order. Since this unit has been set to select any card designated 58, a circuit for relay R1 will be established from line wire W13, through contacts CC2, contacts K of relay R13, the plug wire, and contacts G of relays RT2, RU2 for the right-hand unit, the plug wire, relay R1, and bus wire W90, to line wire W14. Thus this first old card is selected and will be disposed in "11" pocket.

It will now be assumed that a new card lacking the "11" hole and designated 58 with the hundredths column blank, is sensed. In this case relay R13 is not energized and the two comparing units function in the manner first described. The left-hand selector unit is not operative for this card because this unit is set at 9 in the hundredths order with the result that the contacts G of relay RH2 remain open to prevent operation of the relay R2. Since the blank card control is effective with respect to the hundredths order of the right-hand unit, a circuit for relay R1 will be established through the contacts J of R13, contacts F of right-hand relay RH2, and the contacts G of relays RT2, RU2. Thus the card designated 58 with the hundredths column blank is selected and will become deposited in the "11" pocket.

There is a possibility that an old card designated 058 may be sensed, that is, a "0" hole will appear in the column corresponding to the hundredths column of a new card. However, since this card will have the "11" hole, the relay R13 will confine the effect of this card to the units and tens orders of the right-hand unit and this card will be selected and deposited in the "11" pocket as in the case of the card designated 58 which contains no hole in the hundredths column.

If a new card is sensed which is designated 058, it will be selected by the right-hand selector unit, but will not affect the left-hand unit because of the fact that this unit is set at 9 in the hundredths order and relay RH2 remains deenergized.

There are two special conditions which may occur owing to the fact that both units are set alike in respect to the units and tens orders but are not set alike in the hundredths orders.

An example may be taken in the case of a new card designated 858. As this card does not have an "11" hole, relay R13 is not energized whereby the blank card control will function in respect to the hundreds order of the right-hand unit to cause relay RH2 of this unit to be energized at the "8" point in this cycle, opening contacts F of the relay RH2 to prevent energization of relay R1. In the case of the left-hand selector unit, its relay RH2 will not be energized, since this order is set at "9," with the result that contacts G will remain open and prevent energization of relay R2. Thus, a new card designated 858 will not be selected by either unit and will be rejected.

If this card designated 858 should happen to be an old card, however, it should be selected by the right-hand unit because the control number is actually 58. In this case the relay R13 is energized causing contacts K associated with right-hand units to become closed thereby confining the effect of this unit to the units and tens orders with the result that relay R1 will be energized by the closure of contacts G of relays RT2 and RU2 of the right-hand unit. With respect to the left-hand unit, the opening of contacts J of relay R13 will render the left-hand unit inoperative in so far as the selection of a card is concerned; however, even if relay R13 did not operate, the "8" hole in the hundredths column would not set up a circuit to relay RH2 since the hundredths order of this unit is set at "9."

Two special cases must now be considered in which both of the cards, either old or new, may be designated 958 in the units, tens and hundredths columns but, owing to differences in the capacity of the card fields, one card should be selected by the right-hand unit and the other by the left-hand unit. Up until the present time, no case has been considered where the left-hand unit must differentiate between a card which is to be selected by this unit, but which has its units and tens position accidentally coinciding with the setting of the units and tens wheels of the right-hand unit.

If an old card should be sensed designated 58 in the units and tens columns and accidentally having a 9 in what would be the hundredths column of a new card, it is possible that an incorrect selection might be made owing to the fact that the blank card control is not effective in this case with respect to the left-hand unit. When such a card is sensed relay R13 is operative and contacts J open the circuit to relay R2 and prevent the left-hand unit from selecting the card which is punched 9 in the hundredths column. In the case of the right-hand unit the contacts K of relay R13 close and confine the effect of this unit to the units and tens columns, and, since the card agrees with the setting of this unit, such card will be selected as in the case of other cards which are designated 58 in the units and tens columns but have different conditions prevailing in the hundredths column.

If a new card should be sensed designated 958 relay R13 will not be effective, and since this card agrees with the setting of the left-hand unit in every respect, the relay R2 will be energized and this card will be disposed in the "7" pocket. Owing to the presence of the "9" hole in the hundredths column of the card, the relay RH2 for the right-hand unit will be energized as a consequence of the blank card control, opening contacts F of this relay and preventing the energization of relay R1.

It will be seen that the relay R13 and the blank card control cooperate to insure that a proper selection may be effected under various freak conditions which arise from the change from one size field to another.

Alphabetic data is usually recorded in the record cards by means of a combinational hole code, one form of which is illustrated in Patent No. 2,079,422. This patent also shows a specimen record card perforated in accordance with the code described therein. This code consists of combinations of one of the holes in the "0," "11," and "12" positions with the positions "1" to "9" inclusive. Thus the letter D is represented by the combination of a "12" hole and a "4" hole in the same column of the record card. For convenience in description it will be assumed that cards like those disclosed in Patent No. 2,079,422 are to be used.

The construction of the selector units is modified somewhat because of the larger number of selections which must be made possible for each column or order of the selector unit. Since the alphabetic selector units are capable of being set to represent both numerical and alphabetical data the term "denominational order" will continue to be used to refer to the part of the selector unit corresponding to a column on the record card, although the description may be concerned primarily with alphabetic selection feature.

Conveniently, the selector units will be considered, for the time being, as comprising only three denominational orders and the drawings have been confined to disclosing three selector units each comprising three denominational orders in order to avoid confusion and unnecessary duplication of wiring. Figure 2 is a view somewhat similar to Fig. 7 and shows the three setting wheels 50, of one selector unit. The selector units which are capable of selecting cards bearing either numerical or alphabetic data are constructed very much like those disclosed in Fig. 7. The setting wheels 50 as shown in Fig. 3 are loosely mounted on a shaft 51 suitably supported in the machine. There may be as many of these selector units as desired, since the number which may be usefully employed is not limited to the number of pockets available for receiving cards, for a purpose which will be made clear hereinafter.

Secured to each setting wheel 50 are four brush holders designated 52 to 55, inclusive, which are provided with brushes 52a to 52d, inclusive. The brushes 52a, 52b and 52c, 52d, respectively, are paired and electrically connected together. Associated with the brush 52a is a circular row of 37 commutator segments designated 56a, 56b, 56c, 56d, and 56e. The segment 56a corresponds to the blank segment in Figs. 6, 7, and 8. The groups of segments 56b, 56c comprise nine segments which are numbered numerically in Fig. 3 to correspond to the index-point positions of a record column while group 56d contains only eight segments numbered 2 to 9 since there is no "1" and "0" combination in the code. The group 56e comprises ten segments including a "0" segment. The three groups 56b, 56c and 56d are employed when alphabetic data is to be selected while the group 56e is employed only when numerical data is to be selected.

The setting wheels 50 are notched as in the case of the simpler form of the selector unit disclosed in Figs. 7 and 8 and the faces of the teeth are engraved or otherwise marked with the letters of the alphabet, A to Z, inclusive, and the numbers 1 to 9 and 0, and the remaining tooth is left blank. In Fig. 3 the brush 52a is shown resting upon the "1" segment 56b which is the position said brush takes when the wheel 50 is set with the letter A in the viewing position, as in Fig. 2.

Cooperating with the brush 52b is a continuous segment 57 by means of which a circuit may be established through the selector unit extending from an external wire to the ring 57, brush 52b, the brush holder 53, the brush holder 52, and the brush 52a, to the "1" segment 56b, or any other segment with which the brush 52a may be in contact. The brush 52c cooperates with a continuous segment 58 while the brush 52d cooperates with five segments designated 59a to 59e. The segment 59a is of the same size as segment 56a and is disposed in such a position that brush 52d contacts with segment 59a when the brush 52a is resting upon the blank segment 56a. The segments 59b, 59c, 59d are so disposed that, for example, when the brush 52a is in contact with any of the segments 56b, the brush 52d will bear on some part of the inside face of the segment 59b. Similarly, the segments 59c, 59d, 59e correspond to the groups of segments 56c, 56d, 56e. The segment 59e, however, is slightly longer than segment 59b whereby, when brush 52a is resting upon the "0" segment 56e the brush 52d will rest upon the end of the segment 59e. Thus it will be seen that for each group of segments 56b to 56e there is a long segment 59b to 59e. In Figs. 3 and 4a the letters of the alphabet and numerals 1 to 0 are placed adjacent the segments which correspond to the various settings of the wheel 50.

In Fig. 4a the three rows of segments 56a to 56e of a single unit are shown side-by-side while the three sets of segments 58 and 59a to 59e are shown in a separate group to the left of the corresponding group of segments 56a to 56d under the caption unit No. 1. Unit No. 2 and unit No. 3 are similarly shown. All of the segments 56b to 56e which correspond to a given index-point position are connected by means of a wire to the proper segment of emitter E1 and these wires are designated W1 to W9, inclusive in Fig. 4a. Thus all of the segments which bear the numeral "9" in Fig. 3 are connected by a common wire W9 to the "9" segment of the emitter E1. All of the segments 56a and segments 59a are connected in common to a wire W8, segments 59b to wire W12; segments 59c to wire W11; segments 59d and "0" segments 56e to wire W0; and segments 59e to wire W10.

The emitter E1 rotates in synchronism with the sensing of a card whereby all the "9" segments, for instance, of the groups 56b to 56e, respectively, are connected to the line wire W13 at the time the brushes B1 are sensing the "9" index-point positions, and similarly for the other index-point positions.

The continuous segments 57 are connected to relays RU1, RT1, RH1 (Fig. 4b) while the continuous segments 58 are connected to zoning relays ZRU1, ZRT1, ZRH1. In function and operation these relays are equivalent to the relays RU1, RT1, RH1 in Fig. 6, the three additional relays ZRU1, ZRT1, ZRH1 being used to compare perforations in the "0", "11" and "12" positions of the card with the settings of brushes 52c, 52d. The control of the relays ZRU1, ZRT1, ZRH1 is dependent upon the positions of the brushes 52c, 52d as will be made clearer hereinafter by means of specific illustrations.

A second set of six relays is provided for each selector unit and are designated RU2, RT2, RH2, ZRU2, ZRT2, ZRH2. The latter correspond in function to the relays RU2, RT2, RH2 in Fig. 6. Each of the relays designated RU1, RT1, RH1, ZRU1, ZRT1, ZRH1 controls contacts B which may be plugged in series with the contacts A1, A2, A3 of brush relays BRH1, BRT1, BRU1 and the coils of the relays RU2, RT2, RH2, ZRU2, ZRT2, and ZRH2, respectively between the bus wires W50 and W70.

The contacts A1, A2, A3 of the brush relays BRU1, BRT1, BRH1, etc. may be plugged in series with the contacts B of relays RU1, RT1, RH1, ZRU1, ZRT1, ZRH1 and the coils of relays RU2, RT2, RH2, ZRU2, ZRT2, ZRH2, in such fashion as to divide the selector units into sections, each section being capable of selecting records having a predetermined control number whereby it is unnecessary to provide a plurality of separate and dependent selector units each of a fixed capacity.

For this purpose the contacts A1, A2, A3 are arranged in groups which appear in Fig. 4b as vertical rows almost directly below but slightly to the right of the relays RU1, RT1, RH1, ZRU1, ZRT1, ZRH1 to which the contacts correspond, and the contacts A1, A2, A3 of each group are connected by a common wire to the contacts B and are individually connected to plug sockets PS15, PS16, and PS17. As an example, the contacts A1, A2, A3 of the group corresponding to the extreme right-hand relay RU1 in Fig. 4b are arranged in a vertical row connected to contacts B of this relay RU1 by a common wire and are individually connected to the plug sockets PS15, PS16, and PS17, respectively.

The coils of relays RU2, RT2, RH2, ZRU2, ZRT2, ZRH2 are individually connected to plug sockets PS18 whereby any one of these relays may be connected to any one of the contacts A1, A2, A3. In Fig. 4b, the dotted lines show a method of plugging the foregoing relays which is equivalent to the connection of the relays RU2, RT2, RH2 in Fig. 6. This method of plugging places the coil of relay RU2, for example, in series with the contacts A3 of relay BRU1 and the contacts B of relay RU1. Similarly, the contacts B of relay ZRU1 are placed in series with contacts A3 of relay BRU1 and the coil of relay ZRU2. This places the relays RU2 and ZRU2, which correspond to the units denominational order of unit No. 1 in Fig. 4b under control of the units relays RU1, ZRU1 and BRU1.

The relays RU2, RT2, RH2, ZRU2, ZRT2, ZRH2 each control contacts C and D. These relays are associated in pairs, for example, relays RU2, ZRU2 are both associated with a single order, relays RT2, ZRT2 with another, and so forth. The contacts C and D are closed whenever the coils of all the relays for one order are energized. For convenience in illustrating how a comparison is effected between the selector units of Fig. 4a and the designations in the record, reference will be had to the units order of unit No. 1, Fig. 4a which it will be assumed is set to represent "A" as in Fig. 3. This means that the brush 52a will be resting upon the "1" segment 56b, while the brush 52d will be resting upon segment 59b. The letter "A" will be remembered as represented by a hole in the "12" position and a hole in the "1" position in a single column of the card.

While the card perforated to represent "A" is passing the brushes B1, two circuits will be established, one at the "1" point in the cycle and another at the "12" point in the cycle. At the "1" point in the cycle a circuit will be established through the proper brush B1 as follows: Line wire W13 (Fig. 4a), wire 15, the commutator C1 through the "1" segment, the brush CB1, contact roller CR1, brush B1, a plug wire, and the brush relay BRU1 (Fig. 4b), to line wire W14. The energization of the relay BRU1 momentarily closes all contacts A3 of this relay. At the same time, the emitter E1 will close a circuit leading from the wire W13 (Fig. 4a) through the "1" segment of the emitter, the vertical wire W1 (Fig. 4a), the topmost horizontal wire W1, the topmost "1" segment 56b in the extreme right-hand column, brushes 52a, 52b, the continuous segment 57 at the extreme right, the coil of relay RU1 (Fig. 4b), and wire W40 to the line wire W14. The extreme right-hand relay RU1 closes its contacts B which have been plugged in series with a pair of contacts A3 of relay BRU1 now closed. The relay RU2 is thereby energized by a circuit extending from line wire W13 (Fig. 4b), wire W50, contacts B of relay RU1, contacts A3 of relay BRU1, the coil of relay RU2, and bus wire W70 to the line wire W14. Thus, at the "1" point in the cycle, the extreme righthand relay RU2 closes its contacts C and establishes a holding circuit for itself extending from line wire W13 through contacts CC1 (now closed, Fig. 5), wire W60, contacts C of relay RU2, the coil of relay RU2, and wire W70 to the line wire W14. Thus it will be seen that, with respect to the units order of unit No. 1, the relay RU2 is energized when a card designated "A" in the proper column is sensed.

At the "12" point in the cycle a similar circuit is established through the brush BRU1 in consequence of the "12" hole in the card. This circuit is similar to the one established by the "1" hole and need not be described. At the same time the emitter E1 will close a circuit as follows: Line wire W13 (Fig. 4a), the "12" segment of emitter E1, the wire W12, the segment 59b at the extreme right in Fig. 4a, the continuous segment 58, the coil of the extreme right-hand relay ZRU1 (Fig. 4b), and wire W40, to line wire W14. The relay ZRU1 functions in exactly the same fashion as the nearest relay RU1 on the right and causes the energization of the extreme right-hand relay ZRU2, a similar holding circuit for this relay being established between wires W60 and W70 as for the relay RU2.

When the analysis of the card is completed both of the relays RU2 and ZRU2 will be in energized condition and will be holding closed their contacts D. This causes a circuit to be established through the extreme right-hand relay RU3 (Fig. 4b) which is associated with the units order of unit No. 1, there being three relays RU3, RT3, and RH3 associated with each selector unit including unit No. 1. This circuit extends as follows: Line wire W13, wire W16, contacts D of relays RU2 and ZRU2, the coil of the relay RU3, and wire W17, to line wire W14.

Relay RU3 closes its contacts E to establish a holding circuit for itself extending from wire W13 (Fig. 4b), through contacts CC1, wire W18, contacts E of relay RU3, the coil of said relay, and wire W17, to line wire W14. The relays RU3, RT3, and RH3 in this case function similarly to the relays RU2, RT2, and RH2 in Fig. 6 dealing with the simple case of numerical selection and each opens contacts F and closes contacts G. The contacts F and G have the same function in Fig. 4c as the contacts F and G in Fig. 6 and may be plugged to relays R1, R2, etc., in the same fashion as in Figs. 4c, 9, or 10.

If the setting of unit No. 1 agrees exactly with the designations in the card in all three columns corresponding to the three relays RU3, RT3, RH3, all of the contacts G of these relays will be closed and all contacts F opened. For instance, if plug wires are inserted between the plug sockets PS5, PS8, and PS10 as in Fig. 4c, a circuit will be established as follows: Line wire W13 (Fig. 4c), contacts CC2; wire W80, the plug wire between plug sockets PS5, PS8; contacts G of the relays RH2, RT2, RU2; the plug wire between plug sockets PS5, PS10, relay R1, and wire W90, to the line wire W14. Relay R9 establishes a holding circuit for itself through its contacts H extending from line wire W13, through contacts CC3, the contacts H and the coil of relay R1, and wire W90 to line wire W14. The relay R1 also closes its contacts I to render the emitter E2 effective during the following cycle to cause the disposition of the card in the "11" pocket as described above. A plug wire is inserted between the plug socket PS6 associated with the relay R1 and a plug socket PS7 associated with the "11" segment of emitter E2. The foregoing description assumes that every column contains alphabetic designations.

Now let it be assumed that instead of being set at "A" the units order of unit No. 1 was set at "J" (represented by "1" and "11" holes) and that a card designated "J" in the units column is sensed by brush B1. Similar circuits will be established and the relay RU2 will be energized as before, but in this case the circuits for relay ZRU1 will be established at the "11" point through wire W11, the brushes 52c, 52d and segment 59c instead of the segment 59b. The circuit for relay RU1 will be established through wire W1 and the "1" segment 56c instead of "1" segment 56b. In a similar fashion, if the selector is set at "s" and the card happened to be designated "S" (represented by "2" and "0" holes), for example, the emitter E1 will close circuits through its "2" segment, the wire W2, the "2" segment 56d and also through the "0" segment wire W0, brushes 52c, 52d, and the segment 59d for the units order of unit No. 1. The relays designated by the prefix Z may be termed zoning relays since the "0," "11," and "12" holes which control the energization of these relays are usually termed zoning holes. The purpose in providing the zoning relays is to enable the selector units to discriminate between those characters which are designated alike in respect to the positions 1 to 9, but differ in respect to the designations "0," "11" and "12."

The selector units not only are capable of selecting according to alphabetic designations, but are also capable of selecting when the cards are merely numerically designated. Owing to the provision of the additional circuits for the zoning control, it is necessary that the operation of numerical selection be effected slightly differently than in the simple case first described in conjunction with Figure 6. This is due to the fact that both relays RU2 and ZRU2, for example, corresponding to the units order of a selector unit must be energized in order to energize the associated relay RU3. In other words, when there is no "0," "11," or "12" hole present, but merely a hole in one of the positions "0" to "9," inclusive, it is necessary to invariably energize the relays ZRU1 and ZRU2 as well as the relays RU1 and RU2.

This invariable energization of the zoning relays is effected by parallel circuits as follows: Line wire W13 (Fig. 4a), contacts CC7, wire W10, the segments 59e, the brushes 52c, 52d, the continuous segments 58 and the coils of relays ZRU1, ZRT1, ZRH1 (Fig. 4b), and the wire W40, to line wire W14. When the setting wheels 50 are set to any one of the numerical positions "0" and "1" to "9," inclusive, the corresponding brush 52d will rest upon segment 59e. Thus it will be seen that when the cards are numerically designated in one or more columns, each of the relays ZRU1 and ZRT1 and ZRH1 which correspond to a column lacking one of the zoning holes in the "0," "11," or "12" positions, but having a single hole in one of the other positions, including the "0" position, will be automatically energized. A "0" hole in any column is not considered a zoning hole when occurring alone. At the same time one or more of the relays RU2, RT2, RH2 will be energized under control of the holes in the "0" to "9" positions in the manner described above, through wires W0 to W9 and segments 56e, whereby for each zoning relay which is energized the corresponding relay RU1, RT1, RH1 will be energized. Thus for those columns which contain only a hole in one of the positions 0–9 inclusive, the corresponding relay RU3, RT3 or RH3 will be energized upon an agreement between the card and the selector unit.

This makes it possible to select cards bearing combinations of numerical and alphabetical data such as addresses, stock numbers, style numbers, model numbers, etc., in which letters and numerals are commonly combined, by merely setting one of the selector units to correspond. For instance, a classification such as "style No. 2AA" may be selected by merely setting one of the selector units to "2" in the hundreds order and to "A" in the units and tens orders, respectively. Obviously, with the selector units of suitable capacity, cards bearing names and addresses may be selected in accordance with both the name and address or the address alone as well as in accordance with account numbers and numerical data.

Figure 10:
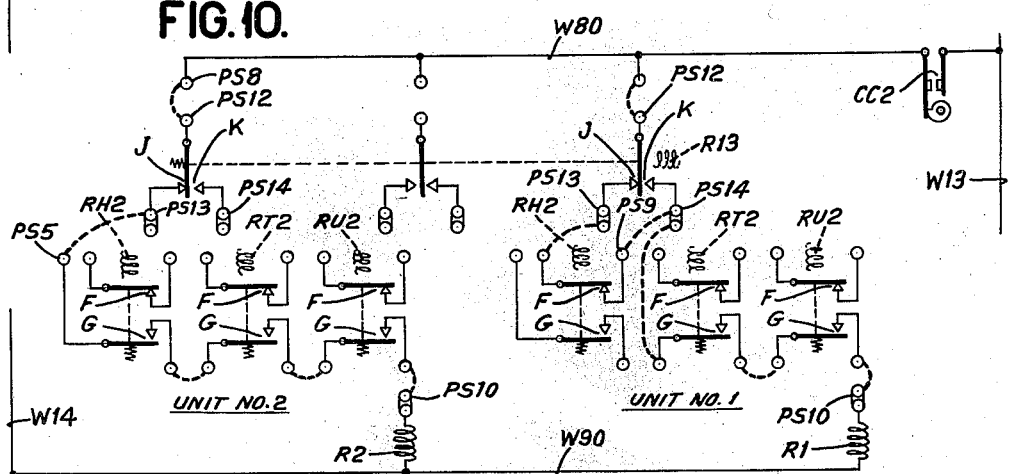

The blank card control functions substantially the same in Fig. 4c as in Fig. 6 and may be plugged in identically the same fashion as described heretofore with reference to Figs. 6, 9, and 10, but there are certain conditions calling for use of the blank card control which arise in selecting alphabetically designated cards that do not arise as a rule when the cards are designated numerically. Heretofore, in discussing the blank card control, it was assumed that there were no blank columns occurring in a field between the columns having holes but that only the remaining columns of the field to the left of the highest denominational order were blank. For example, in explaining the operation with respect to a three column field, it was assumed that only data of the form "--3", "-58" and "958" occurred and that no combinations like "8-8", or "8--", occurred, the dash signifying a blank column. In other words, no cases were considered where the numbers are split by blank columns requiring that the selector units be correspondingly set to the blank position between those orders which must be set to represent numbers or letters.

In the recording of alphabetic data, it is quite common to provide spacing columns to separate the parts of alphabetic data in order that the printing of such data by the tabulating machines may be easily readable. Thus, a name like John Smith requires at least ten columns with the fifth column from the left blank. Furthermore, in the recording of alphabetic data the unused columns will usually appear at the right-hand side of the field, instead of at the left as in the case of numbers. It is very common also in recording addresses on the card to commence with the first column of a field on the left, placing the number of the street in the first few columns, then leave a blank space and finally the name of the street. Patent No. 2,079,422 illustrates the common method of punching the alphabetic field with names. Usually the surname is placed in the extreme left-hand columns of the field and the given name or initials are placed in the columns on the right immediately following. This practice in perforating the cards requires that the blank card control be made effective for the columns which are left blank to space the parts of alphabetic data on each other.

When cards are identified by alphabetical data or combinations of alphabetical data and numerical data, involving the use of spacing columns and necessitating that the first column on the left be utilized as the starting point for perforating the data in the field as is usual with names and addresses, the selector units in use at any one time must all have the same capacity, in respect to the number of denominational orders involved, as the maximum number of columns which are likely to be needed. In other words, if the purpose is to select cards designated by names, the selector units must all comprise as many orders as the number of columns required to record the longest name, including the spacing columns. Thus, in order to be useful for selecting names alone, it is desirable that the selector units comprise at least twenty denominational orders. It will also be necessary, in setting the selector unit, to set the wheels 50 in the same relative positions in the selector units as the corresponding holes appear in the card field. Thus, to set the selector units to select a name like John Smith, it is first necessary to set the five highest order wheels 50 of a selector unit to represent John, then set the sixth order from the left to the blank position, set the next five orders to represent Smith, and finally set the remaining orders down to and including the units order to the blank position. The reason for doing this is that the cards will be placed in the hopper face down with the "9" positions nearest the brushes B1. Alternatively it would be necessary to set the units order of the selector unit to S, the tens order to M, the hundreds order to I, etc., and then reverse the plugging of the brushes B1 to the plug sockets PS4. This is not a very convenient method of setting the selector unit because the names and addresses will appear in reverse when viewing the selector unit and mistakes can easily occur in setting the selector unit. The most logical way of setting the wheels 50 of any unit is to begin at the left with the initial letter of the surname and proceed to the right as in writing. It is mainly for this reason that the contacts of relays RU3, RT3, RH3, etc., are individually connected to plug sockets and, in what has been considered the units position with reference to Figs. 4c and 6. An extra set of contacts F has been provided, although such contacts are not required for the illustrative examples which have been given heretofore. As will be seen later, the adaptation of the selector units to be split into sections will make it necessary that each relay of each group RU3, RT3, etc., be provided with both F and G contacts. When it is desired to render the blank card control effective with respect to any spacing column, the contacts F of the relay RU3, RT3, or RH3 corresponding to that column are placed in series with the contacts G of the remaining relays RU3, RT3, etc., of the selector unit whereby, on the occurrence of a perforation other than "0" in the column for which the blank card control is effective, the contacts F will open and prevent operation of the particular one of relays R1, R2, etc., exactly as described in conjunction with Figure 6. The card blank control is rendered effective for any order by setting the wheel 50 for such order to the position denoted by the blank face 50a in Fig. 3 which causes the brush 52a to take a position on the blank segment 56a. This blank control is operative regardless of whether or not the remaining orders of the selector device are set to select cards with numerical data or alphabetic data. For example, let it be assumed that the hundreds order of selector unit No. 1 (Fig. 4a) is set to the blank position and the remaining orders are set to represent alphabetical or numerical data. The closure of contacts CC4 establishes a circuit from the line wire W13, through the brushes 52a, 52b for the hundreds order, blank segment 56a, the continuous segment 57, relay RH1, and wire W40, to line wire W14. A parallel circuit is also established through the brushes 52c, 52d and segment 59a to the continuous segment 58 for the hundreds order, the relay ZRH1, and wire W40 to line wire W14. Consequently, both relays RH1 and ZRH1 and their companion relays ZRH2, RH2, RH3 will be energized whenever a perforation other than zero appears in the hundreds column, thereby causing the contacts F of relay RH3 to open. In this case the blank control is rendered effective for the hundreds order of unit No. 1 by means of plug wires as illustrated at the left in Fig. 9 by the plugging of unit No. 2 whereby the opening of contacts F of relay RH3 for unit No. 1 will prevent energization of the relay R1. Thus unit No. 1 will select cards which agree with the setting of the units and tens orders only when the hundreds column of the card is blank or contains a "0" hole.

There are certain conditions which are met in dealing with cards bearing alphabetical designations which must be taken into consideration in setting the selector units. The description up to the present covers relatively simple cases like stock numbers and model numbers which may be recorded similarly to account numbers in which some of the left-hand columns in the card field will be blank. In other words, a classification like style No. 2A6 can be recorded in a six column field by placing a "6" hole in the first column on the right, treating this as the units order, then recording the letter A and the numeral 2 in tens and hundreds orders respectively. One of the selector units may be set correspondingly, and, as the style numbers are likely to vary in respect to the number of columns required and different style numbers are to be selected by other selector units, the blank card control will be rendered effective in the case of the unit set to represent 2A6, for the remaining three orders.

It is usually more convenient for the operators who punch the cards to start with the first column at the left of a field, since the machines which perforate the cards are not equipped with decimal tabulating mechanism enabling the card carriage to be moved directly to the first column to be punched. In other words, in a field assigned to the reception of combination alphabetical and numerical data such as style numbers which are not to be added but are merely to be printed by the tabulating machine, the numbers can be placed in the left-hand columns and it is not necessary that such data be denominationally located in the right-hand columns of a field as must be the case with amounts. This is because the units, tens, hundreds, etc., orders for the card field must coincide denominationally with the accumulator positions of the tabulating machine. Thus, after punching an amount field immediately to the left of the style number field, the operator will find it more convenient to proceed immediately with the punching of the style number and, when this is completed, press the usual skip key to enable the card carriage to move automatically to the first column of the next field to be punched, skipping those columns at the right-hand side of the field which would ordinarily receive the units, tens, hundreds, etc., orders of amounts. Thus a style number like 2A6 can be recorded in the style number field by punching a 2 in the first column, an A in the next succeeding column on the right, and a 6 in the third column from the left. The selector units can be set accordingly, beginning at the left, and, with a 6 column field the units, tens and hundreds orders of the selector unit can be set at the blank position and the F contacts of relays RU3, RT3, RH3 of the selector unit can be plugged in series with the contacts G for the remaining orders. It will be understood, of course, that with this illustrative example, there will be six relays like RU3, RT3, RH3, although not shown in the drawings for sake of simplicity. This illustrates how the F contacts may be used in the units, tens, and hundreds orders of a selector unit in contradistinction to the examples which were first chosen above dealing with numbers. Obviously, numbers may also be selected in the same way even though the punching of such numbers in the card begins with the first column on the left instead of with the proper denominational order near the middle of the field.

The blank card control makes it possible to select cards with hyphenated names like Hall-Smith or foreign names like De Valera, or cards in which the discrimination between names must be based on the first and middle initials of the names or upon the middle name and the given name. Thus in the case of names like Smith, Green, Jones, etc., which are very common, the discrimination must be based upon the initials of the name or the middle name and given name. The blank card control makes it possible to discriminate between two names which are identical but belong to different people, by arbitrarily perforating the cards so that there is a greater spacing in one case than in another.

It is a well known fact that such names as Smith, Green, and Jones are often coupled with the more common given names like John and Thomas with identical middle initials whereby it becomes extremely difficult to differentiate between them except by means of the address or account number or some other means which may not be involved in the alphabetic recording of the name on the card and does not appear in the same field as the name.

Thus if there should be two John Smiths, and nothing else in their names, such as a middle initial, to differentiate them, it is possible to record one of the names with a single column space between the parts of the name and in the other case employing a double column space. One selector unit can then be set with two positions at blank control and the other with one position at the blank control and the two selector units will then differentiate the cards merely by the position in the card of the given name.

In the foregoing explanation as to the selection of style numbers which may be composed of both numerals and letters, it has been assumed that either only letters or only numerals will be recorded by means of designations in the columns of the field assigned to the style numbers. For instance, it was assumed that in the case of style numbers like 2A6 the column in which the 2 or the 6 is recorded will never contain alphabetic data. It is also assumed that in recording names and addresses, the addresses are recorded in separate fields whereby the numerals of the address are never recorded in the same columns as the names of persons or firms. With the circuits so far described, selections will be effected correctly so long as there is no mixing of numerical and alphabetical data, that is, so long as there is no likelihood that when one of the selector devices is set to a numerical value, for instance in a given order, the corresponding column of the card will never contain alphabetical data.

The reason for this is that when a selector unit is set to select according to numerical values only, the relays ZRU2, ZRT2, ZRH2, etc., are invariably energized, it is possible that a card having alphabetical designations might accidentally have all of the holes in the 1 to 9 positions correspond in value to the setting of the selector unit which, obviously, would cause an incorrect selection. For example, it may be assumed that one of the selector units is set to select cards designated 2A6, if now a card designated BA6 is sensed, the "2" hole in the hundreds column which is part of the designation of the letter "B" according to the combinational code, will set up a false comparison between the selector unit and the card sensed. The zoning relay for the hundreds position of the selector unit in question will be automatically energized as described above. Thus, a card like BA6 will be selected the same as a card correctly designated 2A6. The same thing would happen if the card was designated SA6 because the letter S is also represented by a hole in the "2" position. Means must be provided to prevent such false selections where it is desired to select only numerical values and there is likelihood of the occurrence of alphabetical data in the column corresponding to the order of the selector unit which is set to a numerical value only.

This means consists of three groups of relays designated BRH2, BRT2, BRU2 (Fig. 4b), which are connected in parallel with the brush relays BRH1, BRT1, BRU1, etc., through contacts CC5; the relays HRH1, HRT1, and HRU1; and the relays RU4, RT4, and RH4. There is a group of relays BRU2, RU4, HRU1 for each column of the field, that is, each denominational order of the selector units. The contacts L of relays BRH2, BRT2, BRU2 and the contacts M of relays HRH1, HRT1, HRU1 are in series with the coils of relays RH4, RT4, RU4 between the line wires W13 and W14. For example, the contacts of relays BRH2 and HRH1 and the coil of relay RH4 form a series circuit. The relays BHR2, BRT2, BRU2 are energized whenever the corresponding relays BRH1, BRT1, BRU1 are energized.

The contacts CC5 are designed to close only while the "0", "11", and "12" positions of the card are being sensed (Fig. 5). Thus the relays BRH2, BRT2, BRU2, etc., will be energized only when holes are present in "0", "11" and "12" positions of the units, hundreds, and tens columns and selectively according to the column in which the hole may appear. Contacts CC6 on the other hand, are closed only during the period that the card is sensing the "1" to "9" positions, inclusive. If a single hole appears in a given column either a relay such as BRH2, for example, or a relay HRH1, (but not both) will be energized according to whether the single hole is in "0", "11" or "12" positions or in one of the positions "1" to "9" inclusive. Relays HRH1, HRT1, HRU1 are in series parallel with contacts N of relays BRH1, BRT1, BRU1, contacts CC6, and switch S3, between line wire W13 and bus wire W10. Thus energization of relay BRU1 closes its contacts N and energizes relay HRU1 provided there is a hole in the "1" to "9" positions of the units column of the field.

When a card containing both alphabetical and numerical designations in the units column, for example is sensed, both the relay BRU1 and its companion relay BRU2 will be energized together during the same cycle. Thus relay BRU1 is, in effect, connected in parallel with relay BRU2 through the contacts CC5. Relay BRU1 will close its contacts N to establish a circuit through relay HRU1 as follows: it being assumed that the switch S3 is closed; line wire W13, contacts CC6, contacts N of relay BRU1, the coil of relay HRU1, and wire W10, to the line wire W14. Relay HRU1 closes its contacts O to establish a holding circuit for itself from the wire W10 through the contacts CC1. Later in the cycle relays BRU1 and BRU2 will again be energized without any effect, however, as far as relay BRU1 is concerned, but relay BRU2 will close its contacts P and establish a holding circuit for itself from line wire W13, contacts CC1, wire W18, contacts P of said relay, the coil of said relay and contacts CC5, to the line wire W14. Energization of relay BRU2 completes a series circuit through the coil of relay RU4.

Figure 11:
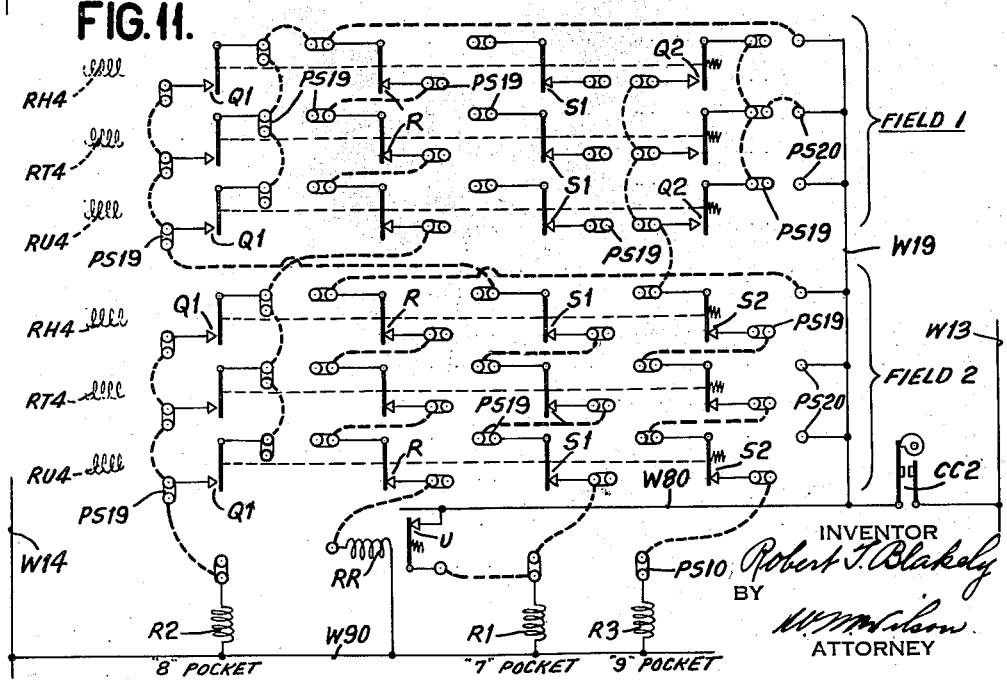

The relays RU4, RH4, RT4 each close contacts like Q1, Q2 and open contacts like R, S1, and S2 (Figs. 4b and 11). Each of the contacts Q1, Q2, R, S1, S2 is connected to double plug sockets PS19 by means of which these contacts may be connected in various combinations of series, parallel, and series-parallel for several different purposes to be explained hereinafter. Associated with the contacts Q1, Q2, R, S1, S2 is a wire W19 which is connected to the wire W80 and connects in common a series of plug sockets PS20.

Now let it be assumed, for instance, that it is desired to select a card designated 2A6 and there is a possibility that a card designated BA6 or SA6 may be sensed. Plug wires are inserted between plug sockets PS19, PS20 (Fig. 4b) and a plug socket PS21 (Fig. 4c) as shown in Figs. 4b and 4c. The plug socket PS21 is connected to the coil of a relay RR (Fig. 4c) which may be termed the reject relay since its function is to cause the rejection of cards when plugged in various ways to the contacts Q1, Q2, R, S1, S2. Relay RR closes holding contacts T (Fig. 4c) which are connected to the coil of the relay and to the contacts CC8 (Fig. 4c). Relay RR also opens contacts U which are connected to wire W80 and to a plug socket PS22. From the manner of plugging of the contacts Q1 (Fig. 4b) it is apparent that only the contacts Q1 of relay RH4 will be operative to control relay RR. If it should happen that two holes appear in the hundreds column, as would be the case if the card were designated BA6, relay RH4 will be energized due to the fact that both relays BRH2 and HRH1 are energized, thereby closing the circuit through relay RH4 as described above. Thus, when a card designated BA6 is sensed, the contacts Q1 of relay RH4 will be closed and will remain closed until the end of the cycle.

Let it be assumed that unit No. 2 in Fig. 4a is the one set to select cards designated 2A6. Instead of inserting a plug wire between the plug socket PS8 and a plug socket PS5, as shown in Fig. 4c, for unit No. 1, a plug wire is inserted between plug socket PS22 and the extreme left-hand plug socket PS5 for unit No. 2 as shown by the dotted line in Fig. 4c. This places the contacts G of the relays RU2, RT2, RH2 of unit No. 2 in series with the contacts U of relay RR.

Now, if a card is sensed bearing the designations 2A6, relay RH4 will not be energized and hence its contacts Q1 will remain open preventing energization of relay RR. Since contacts U of relay RR remain closed this card will be selected and deposited in the proper pocket in the fashion described above. However, if a card designated BA6 is sensed, the "11" hole in the hundreds column of this card will cause the relay RH4 to be energized as described above due to the closure of contacts N of relay BRH1 and contacts P of relay BRH2 with the result that contacts Q1 of relay RH4 will close. This will cause relay RR to be energized by a circuit as follows: Line wire W13, contacts CC2, wire W80, wire W19, the plug wire contacts Q1 of relay RH4, the plug wires, relay RR, and wire W90, to line wire W14. Relay RR closes its contacts T and establishes a holding circuit for itself extending from line wire W13, wire W100, contacts CC8, contacts T and the coil of said relay, and wire W90, to line wire W14. Relay RR will open its contacts U and the circuit for the relay R2 cannot be established, notwithstanding the fact that the selector unit tends to close the circuit for said relay through the contacts G, or F and G, of the relays RU3, RT3, RH3 for unit No. 2.

Obviously, this rejection control for causing the rejection of cards which set up accidental comparisons may be made effective for as many columns and as many selector units as desired and for this purpose relay RR is provided with a number of contacts U individually connected to plug sockets PS22. This feature makes it possible to arbitrarily segregate alphabetically designated cards from cards which are purely numerical with respect to certain fields.

For instance, records like balance cards and name-and-address cards, which often have recorded therein only the balance, account number and the name and address, and sometimes only the name and address, may be distinguished from detail cards which may have only numerical data in the columns corresponding to the alphabetical field.

In order to obtain this result it is not necessary to set the selector units to any definite value. It is necessary to plug a plurality of the brush relays BRU1, BRT1, BRH1, etc., to the brushes B1 sensing a group of columns of the field in which there will either be only alphabetical data or only numerical data.

The contacts Q1 of all the relays RU4, RT4, RH4, etc., corresponding to those of the brush relays BRT1, BRT2, BRH1, BRH2, etc., which have been rendered effective by plugging brushes B1 to the last named relays, are connected in parallel by means of plug wires in plug sockets PS19 in the same general way as shown at the left in Fig. 11 by the upper three contacts Q1, and plug wires are also inserted between plug sockets PS19 and PS20 and PS19 and PS21 as in Figs. 4b and 4c whereby the coil of relay RR is connected in series-parallel relation with contacts Q1 of all the active relays RU4, RT4, etc. A plug wire is also inserted between plug socket PS22 and the plug socket PS19 for relay R2. Only one relay such as R1, or R2 need be used in this case and it is immaterial which is selected for operation or which of the segments of emitter E2 is plugged to contacts I of the selected relay R2.

When a card is sensed having alphabetical data in the field controlling the active relays BRU1, BRT1, etc., at least one of the relays RU4, RT4, RH4, will be energized because at least one of the columns sensed by the brushes B1 will contain a "0", "11", or "12" hole. In all probability, even taking into consideration the blank spacing columns, there will be a plurality of the relays RU4, RT4, RH4 energized with the result that relay RR will be energized and will open the circuit for the relay R2 by opening contacts U. It is evident that any card which bears even a single alphabetical designation will be rejected. On the other hand, as long as relay RR remains deenergized, as will be the case when the card contains only numerical designations, contacts CC2 will close a circuit near the end of the card sensing cycle for a given card as follows: Line wire W13, contacts CC2, wire W80, contacts U of relay RR, the plug wire, relay R2, and wire W90, to line wire W14. Relay R2 will establish a holding circuit for itself through its contacts H, and, during the following cycle, the sorting magnet SM will be energized as before through the contacts I of relay R2 at a time depending upon to which of the plug sockets PS7, contacts I are connected by a plug wire. In this manner all numerically designated cards will become deposited in one of the numerical pockets while the alphabetically designated cards will become disposed in the reject pocket.

The relays RU4, RT4, RH4, etc., may be utilized for the purpose of sorting cards into the respective pockets according to type, each type comprising at least two fields, each of which may contain either no data, alphabetical data, numerical data, or mixtures of alphabetic and numerical data like 2A6, for example. This feature will be described with reference to Fig. 11 which shows how the machine is plugged to sort cards according to various combinations of alphabetical and numerical data in two separate fields. For purposes of simplicity, it will be assumed that there are two separate fields in the card and that with respect to each field, three of the relays RU4, RT4, RH4 have been rendered effective by plugging three of the brushes B1 for each field to three of the brush relays such as BRU1, BRT1 and BRH1. It will be understood that the selector units in this case are not in use and that no plug wires have been inserted between plug sockets PS18 and any of the plug sockets PS15, PS16, PS17. Three relays R1, R2, R3 and the reject relay RR are used in this case and are plugged to the contacts Q1, Q2, R, S1, S2 as shown in Fig. 11. Relays R1, R2, R3 have their contacts I plugged to the "7", "8", and "9" segments of emitter E2.

Since contacts R, S1, and S2 open and Q1, Q2 close upon the occurrence of alphabetic data in the columns controlling the relays RU4, RT4, RH4, it is apparent that when field No. 1 contains alphabetical data and field No. 2 contains no data or only numerical data, relays R1, R3 will be energized since at least one of the contacts Q1, Q2 controlled by field No. 1 will close thereby establishing a circuit as follows: Line wire W13, contacts CC2, wire W19, the plug wires at the extreme top in Fig. 11, one or more of the upper three contacts Q1, all of the lower three contacts S1, the coil of relay R1, and wire W90, to line wire W14. A second circuit extends from line wire W13, through contacts CC2; wires W80, W19; contacts Q2, S2; the coil of relay R3, and wire W90, to line wire W14. With relays R1, R3 controlling the distribution as indicated in Fig. 11 any card which contains only alphabetical data in field 1 and no data or only numerical data in field 2 will be deposited in the "9" pocket. Although both relays R1, R3 are energized, only relay R3 has any effect as the brushes of emitter E2 wipe over the "9" segment before touching the "8" and "7" segments so that sorting magnet SM is energized at "9".

In case both field 1 and field 2 contain alphabetical data, at least one of the lower three contacts S1, associated with field 2 will open and prevent energization of relay R1. Contacts R and S2 will also open and prevent energization of relays RR, R2, R3 notwithstanding the fact that the contacts Q1, Q2 close. Since the coil of relay R1 is also plugged to contacts U of relay RR, a circuit will be established through relay R1 when contacts CC2 close and causes a card which contains alphabetical data in both fields becomes deposited in the "7" pocket.

When field 1 contains numerical data or is blank and field 2 contains alphabetical data, contacts R and S for the upper three relays RU4, RT4, RH4 will remain closed and contacts Q1, Q2 remain open, while the contacts Q1 of the lower three relays RU4, RT4, RH4 will close and the corresponding contacts R, S1 and S2 will open. This causes a circuit to be established through the upper three contacts R in series and one or more of the lower three contacts Q1 to relay R2. Since the lower three contacts R also open, relay RR cannot be energized and contacts U of relay RR remain closed. It is thus possible to energize both relays R1 and R2 together when contacts CC2 close to the end of the cycle. However, the contacts I of relay R2 are plugged to the "8" plug socket PS7 causes a card having no data or only numerical data in field 1 and alphabetic data in field 2 to become deposited in the "8" pocket, consequently the emitter E2 closes a circuit to magnet SM through the "8" segment before it can close a circuit through the "7" segment. As a result the card is deposited in the "8" pocket.

If both fields contain only numerical data, or one of them is blank with numerical data in the other, none of the relays RU4, RT4, RH4 will be energized and relay RR will be energized by a circuit through the contacts R to the lower three relays RU4, RT4, RH4 thereby opening contacts U and preventing energization of relay R1 when contacts CC2 close. Although contacts S1, and S2 remain closed, the contacts Q1, Q2 remain open and it is impossible to energize relays R1, R2, R3 whereby the card will be rejected.

In the foregoing examples, if both alphabetical and numerical data occurs in one of the fields, the effect will be the same as if only alphabetical data appeared, in other words, if the alphabetical field also contains numbers as is the case in name and address fields, the cards will be treated as if the field was wholly alphabetical since it only requires closure of only one of the contacts Q1, Q2 to energize the relays R1, R2, R3. If it is desired to render these relays responsive only to wholly alphabetical data, the contacts Q1, Q2 may be connected in series whereby they will close circuits for relays R1, R2, R3 for a particular field only when every column in that field contains a combination of holes to signify a letter of the alphabet. In view of the fact that spacing columns are used so commonly in alphabetical fields, it is necessary to connect the contacts Q1, Q2 in parallel, otherwise the spacing columns will prevent energization of one or more of the relays RU4, RT4, RH4.

The advantage of disposing of cards which have alphabetical data in field 1 and numerical data in field 2 and cards which have alphabetical data in both fields in a common pocket is that the first type of card will most likely be an address card and the numerical data appearing in field 2 may be the number of the street address. This provides a means of separating name and address cards from other cards such as balance cards and detail cards since the detail cards will usually be wholly numerical while the name and address cards will usually be at least partly alphabetical in the second field.

The cards which are ordinarily wholly numerical in both of two fields selected for control purposes may sometimes be blank in whole or in part in such fields due to the fact that one or the other of the fields may be devoted to the reception of code descriptions of items, as for instance, the items to be listed on a bill of goods. Such a code may comprise size, color, dimensions, and other characteristics which might be unnecessary in describing certain kinds of goods. Thus in recording furniture as items on the card such classification as size, color finish material, etc. may enter into a code designation of the article whereas things sold in bulk may require only a quantity and a classification of the kind of merchandise to distinguish them. Thus, a ton of hard coal does not require any dimensional code or color code to complete the description of the article and naturally the columns in the cards provided for size, color, etc. will be left blank. It is plain, therefore, that such cards as may be blank in one or the other of the control fields should be treated as purely numerical in the absence of alphabetical data in the remaining field. An advantage of the machine described herein is that it is capable of treating such special cases in a logical manner notwithstanding the fact that part of the data is missing from the card owing to the non-existence of the data. It is possible also to distinguish records which have alphabetical data, such as name and address cards from item cards which may have code data in the same columns employing letters as well as numbers from each other. To illustrate this, recourse will be had to the first simple case illustrating segregation of alphabetical cards from numerical cards. It will be assumed for the moment that in a given batch of cards there are certain cards which are punched with the name and address and other cards which are punched with combinations of alphabetical and numerical data such as style numbers like 2A6, only three columns being used for control purposes. It will also be assumed that, when such mixtures of numerical and alphabetical data occur in the same field as the name or address, the letters of the alphabet in the style number always punched in the same columns of the item cards and that there will be no likelihood of a letter of the alphabet appearing in a column of an item card which should be always numerical. In the illustrative case, for example, the A of style 2A6 will always occur in column 2 of the field and columns 1 and 3 will likewise always be numerical.

In this case, it is desirable that one of the relays like R2, for example, be energized whenever the three column field contains all alphabetic designations and prevented from energizing when combinations like 2A6 occur. The contacts QI for the relays RU4, RH4, are connected in series-parallel with the coil of relay R2 by suitable plug wires, the relay RR not being plugged in this case. With this arrangement, whenever alphabetical data appears in either or both of columns 1 and 3, relay R2 will be energized and the card will be deposited in the pocket associated with relay R2. However, a card designated 2A6 will be rejected since the relay RT4 is inactive. Cards designated with all numerals in the control field will be treated in the same way as cards like 2A6 having a letter in column 2 and only numerals or blank in columns 1 and 3. In selecting the control fields care must be taken to choose a field which will never be likely to contain the numbers of a street address and for this reason the first few columns from the left of the name field will be most satisfactory since these columns will never have numerals and are unlikely to have spacing columns since sur-names rarely have fewer than five letters.

The description so far has proceeded on the assumption that the machine is composed of a plurality of selector units each having a definite number of denominational orders, and for the purposes of simplifying the drawings and the description they have been confined to units having only three denominational orders. The machine could be built with, let us say, 12 selector units each having a purely arbitrary capacity of six denominational orders whereby six digit numbers, six-letter names, or combinations of six characters may be entered into the selector units and used to control the selection of records. In this case the machine would have a total of 72 positions or orders as a maximum capacity requiring six relays like BRHI, one for each position or denominational order of a column of a six-column field. This arbitrary capacity will give a fairly high degree of flexibility for the selection of numbers but the machine will be limited of course to selecting six digit numbers and their equivalent in alphabetic data or combinations of numerical and alphabetical data. The range of alphabetic selections would be very limited, however, as more than six letters are needed to discriminate between very common names like Smith, Johnson and Green.

If it were desired to select eight digit numbers, it would be impossible to do so when the capacity of the selector units is considered as mechanically limited to six digits. Actually the capacity of the machine for the selection of numbers is practically unlimited as it is possible to take any selector unit and split it into a plurality of sections each of which may retain a control number or alphabetic data or combine parts of one unit with other units.

For example, in the case of a machine in which the selector units arbitrarily comprises six orders, each unit may be split into three sections to select three two-digit numbers and deposit the cards corresponding to each of these three numbers in three separate pockets. On the other hand, by providing a sufficient number of pairs of brush relays like BRH1, BRH2 it is possible to combine several of the selector units or use one to full capacity in combination with part of another unit to select a number or name larger than six digits. Actually the division into units of three orders as shown in Figs. 2, 4a, 4b, 4c, 6 and 7 is largely arbitrary as the selector units may be plugged in such a fashion as to obtain any desired capacity limited only by the number of brush relays like BRH1.

In Figs. 4a, 4b and 4c the machine has been shown as arbitrarily divided into three selector units each comprising three denominational orders as a convenience for explaining the function of the machine for the selection of numerical, alphabetical and combination numerical alphabetical data. However, it is possible to consider the disclosure in Figs. 4a, 4b and 4c as of a single large selector unit comprising nine or more denominational orders, in reality, each denominational order is completely independent of the adjacent orders, and may be combined with others irrespective of their actual position. Now, considering the disclosure in Figs. 4a, 4b, and 4c as comprising a single selector unit, this unit may be divided into any desired number of groupings of denominational orders according to the maximum size and number of the data recorded in a field of the cards by means of designations.

Fig. 12 shows the relays for six of the nine orders appearing in Fig. 4b re-grouped together as if it were a single unit and then arbitrarily split into three sections by means of plug wires so as to be capable of selecting cards having any one of three two-digit numbers. In this view, only three of the brush relays BRU1, BRT1, etc., are shown and only the lower two BRU1, BRT1 are effective since only two-digit numbers are involved appearing in a record field comprising only two columns. It will be understood, of course, that for each of the relays RU1 there may be provided a brush relay like BRU1, BRT1 although this is not absolutely essential. The various denominational orders above the hundreds order are denoted in Fig. 12 by the letters TH, TTH, HTH denoting the thousandths, tens of thousandths, and hundreds of thousandths orders, respectively. Thus relays RTH1, ZRTH1, RTH2, ZRTH2, RTH3 may be considered as associated with the thousands order of a six-order selector unit. The units and tens orders are to be used to select one number, the hundreds and thousandths order to select another number, while the tens of thousands and hundred thousands orders are to be used to select a third number. Section 1, which is set in accordance with one-two digit control number, comprises the relays RU1, RT1, RU2, RT2, ZRU2, ZRT2, RU3, and RT3; Section 2 comprises the relays RH1, RTH1, RH2, RTH2, ZRH2, ZRTH2, RH3, and RTH3; while Section 3 comprises relays RTTH1, RHTH1, RTTH2, RHTH2, ZRTTH2, ZRHTH2, RTTH3, and RHTH3.

These relays, which now function as if they were associated with three separate and distinct selector units, are controlled by the corresponding wheels 50 of the selector unit and by the two brush relays BRU1 and BRT1. The latter are plugged to the brushes B1 sensing the two-column field. In Fig. 12, the contacts G of the relays RU3 to RHTH3 are shown as plugged in the simplest way since no single digit numbers are to be selected in this case. The contacts G of the relays RU3, RT3 control the relay R1, while the two groups of relays RH3, RTH3 and RTTH3, RHTH3 control the relays R2 and R3, respectively.

The function of the machine is exactly the same as described above in conjunction with Figs. 4a, 4b, and 4c. When a hole in the units column of a card agrees with the setting of the wheel 50 corresponding to the units order of any section the corresponding relays RU1, RU2, ZRU2 and RU3 will be energized and consequently the contacts G of relay RU3 will close. If the hole in the tens column of the card also agrees with the setting of the tens order of the same section of the selector unit, the relays RT1, RT2, ZRT2, and RT3 will be energized closing the contacts G of the latter. This will enable a circuit to be established through the relay R1 and a card which has holes agreeing with the setting of the first section will be conveyed to the pocket corresponding to the relay R1. In similar fashion the other two sections operate to control relays R2 and R3 to determine other destinations for the cards which agree with the settings of the wheels 50 for these sections.

Obviously, if selector unit No. 1 in Figs. 4a, 4b, and 4c was composed of say 72 units, the selector unit could be arbitrarily divided into three sections of 24 units to select 24-digit numbers or composite numbers which consist of classification and code numbers.

Instead of placing the selected records in separate pockets associated with the respective sections of the selector, it may be desired to place all records having one of several predetermined numbers or names in a pocket common to a plurality of the sections. As an example, all cards designated either 432 or 685, for example, can be placed in a single pocket. This may be done by setting two sections of the selector unit to 432 and 685 and connecting the contacts I of the corresponding relays R1, R2 (Fig. 4c) in common to a single plug socket PS7. The same result may be had by connecting the contacts F or G of the two sections involved to a single relay such as R1 or R2 by means of its plug socket PS10 instead of to two separate relays. This is one reason why the plug sockets PS7, PS10 are made as multiple plug sockets.

While there has been shown and described and pointed out the fundamental novel features of the invention as applied to a single embodiment, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a sorting machine, sorting mechanism including a series of record receiving pockets, distributing means for controlling the disposition of the records in said pockets, and a single sorting control element operable at different times to selectively control the operation of the distributing means; means to sense designations in records successively presented to the sensing means, said designations representing numerical or alphabetical data or both; a plurality of multicolumn selector devices, each including a plurality of elements manually differentiately selectively movable to any one of a plurality of positions representing portions of data in the records, both numerical and alphabetical; and means jointly controlled by the sensing means and said devices for selectively operating the single machine control element when a record is sensed having its data designations agreeing exactly with settings of the members of any one of said devices.

2. In a record controlled machine, sorting mechanism; means to sense designations in records successively presented to the sensing means, said designations representing numerical or alphabetical data or both; a plurality of multicolumn selector devices, each settable to represent alphabetic data, numerical data, or combinations of alphabetical and numerical data, the settings of said devices corresponding to the designations in certain of the records; means jointly controlled by the sensing means and said devices for selectively controlling the sorting mechanism when a record is sensed having its data designations coinciding with the setting of any one of said devices, and means controlled by the non-corresponding designations in a record for preventing selection by one of said devices when part of the data designations on any record accidentally coincides with the entire setting of said device.

3. In a record controlled machine, machine controlling means; a plurality of multicolumn selector devices, each comprising a plurality of orders, each order including an element movable to any one of a plurality of positions to represent numerical values or characters other than numbers, such as the letters of the alphabet, whereby each of said devices may be set to represent numbers, names, or combinations of numerical and alphabetical data, said members, when set, corresponding to designations in records representing numbers and characters other than numbers appearing in the records; means for sensing the designations, means jointly controlled by the sensing means and all of the selector devices for comparing the data designations with settings of all of said devices to detect the conformity of the designations in the records with the settings of any of said devices, means controlled by the comparing means for causing operation of the machine controlling means when the setting of any selector device wholly agrees with the data designations in any record; and means controlled by non-conforming designations in any record upon an accidental agreement between all, or substantially all, of the data designations on a record and all the settings of any device to prevent selection by said device.

4. A record controlled selecting machine for selecting combinational records, comprising a feeding means for multiple column records bearing combinational indicia, a multiple column record sensing means to analyze columns of the records fed by the feeding means and emit impulses corresponding thereto, a plurality of presettable devices for combinational data each comprising a plurality of columns and having a manually settable brush structure therein, an emitter to send impulses through the settable devices so that differentially timed impulses corresponding to different brush structure settings are emitted therethrough, a multiple column comparing device for determining the likeness or unlikeness of different sets of impulses representing combinational data and controlled conjointly by impulses through the settable devices and the multiple column record sensing means, a plurality of record receiving pockets, and pocket selecting means under control of the comparing means to route records with certain corresponding combinational data to certain pockets and other records with other unlike data to still another pocket.

5. A record controlled selecting machine for selecting combinational records comprising means to feed multiple column records bearing combinational indicia, a multiple column record sensing means to analyze columns of the records fed by the feeding means and emit impulses corresponding thereto, a plurality of presettable devices for combinational data, each comprising a plurality of columns and a manually settable brush structure, an emitter to send a series of timed impulses through the settable devices for each record sensed so that impulses corresponding to the brush structure setting are emitted therethrough, a multiple column comparing device for determining the likeness or unlikeness of different sets of impulses representing combinational data and controlled conjointly by impulses from the settable means through the settable devices and the multiple column record sensing means, and a machine control element rendered effective by the comparing device upon the occurrence of corresponding combinational data.

6. In a machine of the class described, machine control means; a series of multicolumn selector devices, each comprising a predetermined number of orders, means to render the corresponding orders responsive to data designations in a field of maximum size comprising a plurality of columns, certain of said devices being adapted to be set to correspond with data likely to appear in all or nearly all of said columns, while others of said devices are set to correspond with data appearing in a lesser number of columns which may also appear in a field of minimum size comprising fewer number of columns than the field of maximum size; means controlled by said selectors to cause an operation of the machine control means when the designations in the record coincide with the setting of any of the selectors, and means responsive to designations in the records for rendering the selectors which are set to coincide with data appearing in the additional columns comprised in the field of maximum size ineffective to cause an operation of the control means when a record is sensed having the field of minimum size.

7. In a machine of the class described, means to sense records which contain either a field of maximum size comprising a plurality of columns or a field of minimum size comprising a lesser number of columns, a selector device comprising as many orders as there are columns in the field of maximum size and settable to correspond with data in the field of minimum size, means controlled by designations in the records for limiting the effect of the sensing means to the orders corresponding to the columns of the field of minimum size when a record containing such field is sensed by the sensing means, and means associated with the higher orders of said device for rendering said device unresponsive to designations in the additional columns of the field of maximum size when a record is sensed having such field.

8. In a machine of the class described, a record sensing device for sensing data designations in either of two fields comprising different numbers of columns, the field having the lesser number of columns corresponding denominationally column by column with the field having the greater number of columns; a pair of selector devices, each comprising as many denominational orders as there are columns in the larger field, one of said devices being set to correspond with data which may appear in the columns of both fields, the other said device being set to correspond with data which can only appear in the larger field in consequence of such data requiring a greater number of orders for its recording than are comprised in the smaller field; machine control means rendered operative upon an agreement between the setting of either device and the data in the record fields, means controlled by the records for confining the effect of the sensing means to the device set for data appearing in the smaller field and rendering inoperative the device set for data appearing in the larger field when a record is sensed having the smaller field; and means associated with the orders of the first device corresponding to the additional columns of the device set for data in the larger field for preventing selections by the first device when data in the larger field accidentally agrees with the setting of the first device in the columns corresponding to the smaller field.

9. In a machine of the class described, the combination of machine control means; a device for sensing a field comprising a plurality of columns in records successively presented thereto; a series of multicolumn selector devices, each comprising as many orders as there are columns in said field, said devices being preset to correspond with data in said field, different numbers of orders of said devices being required whereby each device responds to data in a different number of columns in said field; machine control means controlled by said devices, and blank column control means associated with the unused orders of said devices for preventing selections by said devices arising from accidental coincidence between data on the records and the settings of the said devices.

10. In a sorting machine, sorting mechanism including a normally inactive control element which is operable at different times to select different destinations for records; a series of selector devices comprising elements settable to represent data designations appearing in records and grouped so that a group of such elements may represent the data on some particular record; means to sense the designations in the records, means controlled by the sensing means for comparing the data on each record with the settings of all of said groups of the settable elements, and means controlled by the comparing means for causing the device for each group to effect an operation of the control element at a specific time when the settings of such device agree with a record sensed by the sensing means.

11. In a record controlled machine, a normally inactive control element operable at different times to effect different results; a series of selector devices comprising elements settable to represent data designations appearing in records and grouped so that a group of said elements may represent the data on some particular record; means to sense the designations in the records, means controlled by the sensing means for comparing the designations on each record sensed with the settings of all of said groups of settable devices, and means controlled by the comparing means for causing the control element to operate at a different time for each group of settable elements which coincides in settings with the data on a record sensed.

ROBERT T. BLAKELY.